United States Patent
Bassa et al.

(10) Patent No.: US 12,518,845 B2
(45) Date of Patent: Jan. 6, 2026

(54) BUILT-IN SELF-TEST CIRCUITRY FOR DATA IN PATH FOR NON-VOLATILE MEMORY WITH MULTIPLE TEST CLOCK SPEEDS FOR MULTIPLE TEST MODES

(71) Applicant: Sandisk Technologies, Inc., Milpitas, CA (US)

(72) Inventors: Siddarth Naga Murty Bassa, San Jose, CA (US); Yenlung Li, San Jose, CA (US); Hirotoshi Mori, Fujisawa (JP)

(73) Assignee: Sandisk Technologies, Inc., Milpitas, CA (US)

( * ) Notice: Subject to any disclaimer, the term of this patent is extended or adjusted under 35 U.S.C. 154(b) by 98 days.

(21) Appl. No.: 18/619,466

(22) Filed: Mar. 28, 2024

(65) Prior Publication Data

US 2025/0308610 A1    Oct. 2, 2025

(51) Int. Cl.
*G11C 29/12*  (2006.01)
*G11C 29/36*  (2006.01)

(52) U.S. Cl.
CPC .... *G11C 29/12015* (2013.01); *G11C 29/1201* (2013.01); *G11C 29/36* (2013.01); *G11C 2029/3602* (2013.01)

(58) Field of Classification Search
CPC .......... G11C 29/12015; G11C 29/1201; G11C 29/36; G11C 2029/3602
See application file for complete search history.

(56) References Cited

U.S. PATENT DOCUMENTS 10,242,750 B2    3/2019   Linnen et al.
11,165,554 B1 *  11/2021  Huss ........................ G06F 1/04
2006/0267637 A1 * 11/2006  Umemura .......... G01R 31/3191
                                              327/77

OTHER PUBLICATIONS

Yuh, Jong, et al., A 1-Tb 4b/Cell 4-Plane 162-Layer 3D Flash Memory with a 2.4-GB/s I/O Speed Interface, IEEE International Solid-State Circuits Conference 2022, Paper, Feb. 2022, 3 pages.
Yuh, Jong, et al., A 1-Tb 4b/Cell 4-Plane 162-Layer 3D Flash Memory with a 2.4-GB/s I/O Speed Interface, IEEE International Solid-State Circuits Conference 2022, Presentation, Feb. 2022, 27 pages.

* cited by examiner

*Primary Examiner* — Uyen Smet
(74) *Attorney, Agent, or Firm* — Pearl Cohen Zedek Latzer Baratz LLP

(57) ABSTRACT

Built-in self-test circuitry of a non-volatile memory device is presented for testing the data path between the input/output (IO) pads of a memory chip and the buffer memory used to store data to be written into or read out of a memory array. One set of tests on the data path can be high speed data path tests to determine whether the memory device can handle the transfer speed of user data transfer to and from the memory device. However, this requires data path testing based on a high speed test clock which may not be suitable for other test modes, such as setting trim values. To address this issue, the following presents testing techniques and circuitry for data path testing having multiple modes, in which the frequency of the test clock signal is divided by differing amounts depending on the test selected.

20 Claims, 21 Drawing Sheets

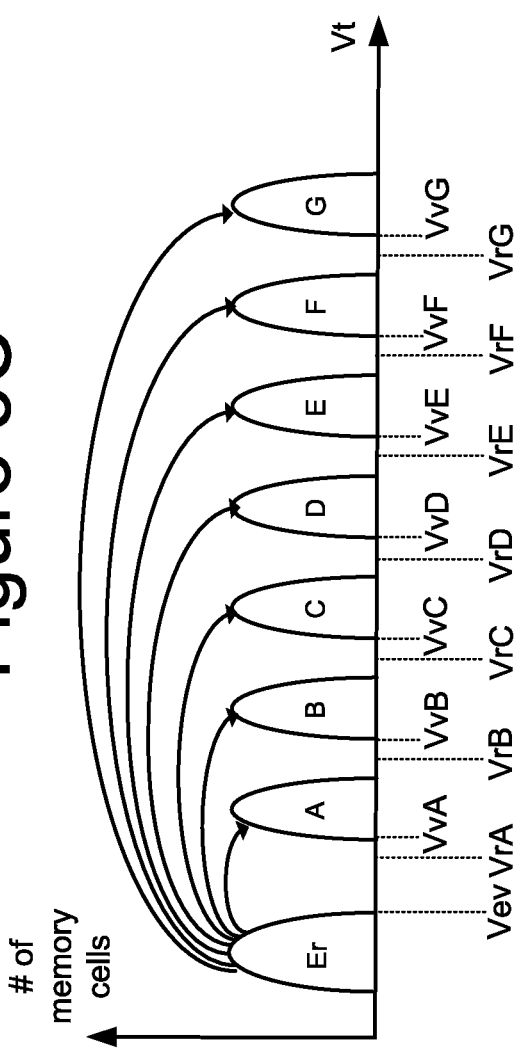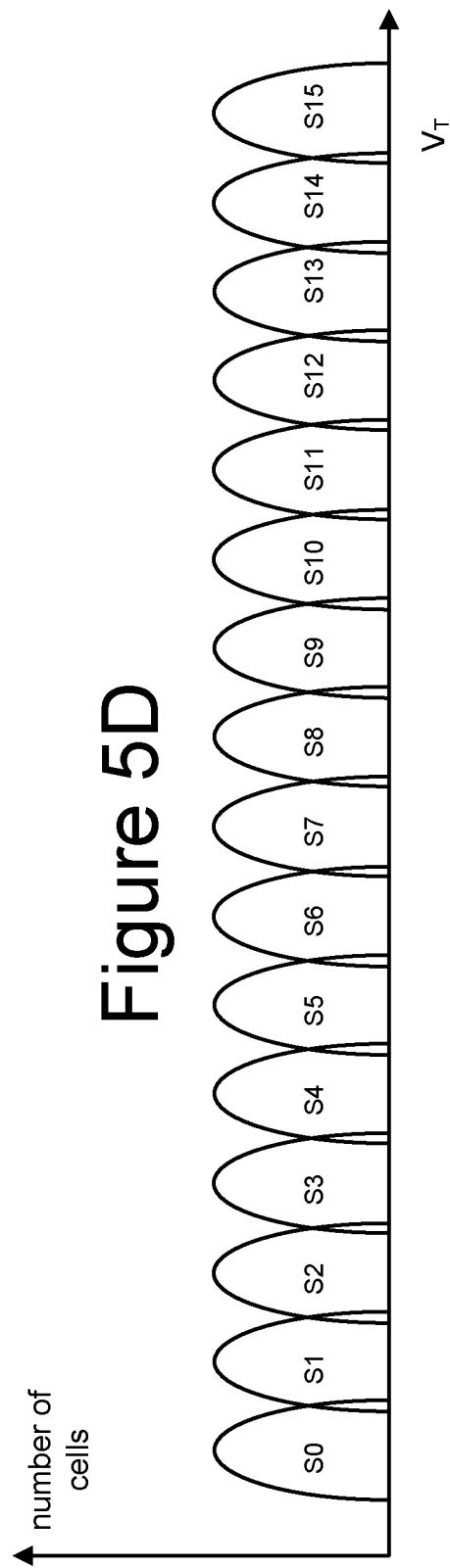
Figure 5C
Figure 5D

BUILT-IN SELF-TEST CIRCUITRY FOR DATA IN PATH FOR NON-VOLATILE MEMORY WITH MULTIPLE TEST CLOCK SPEEDS FOR MULTIPLE TEST MODES

BACKGROUND

The present disclosure relates to non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery). One example of non-volatile memory is flash memory (e.g., NAND-type and NOR-type flash memory).

Users of non-volatile memory can program (e.g., write) data to the non-volatile memory and later read that data back. For example, a digital camera may take a photograph and store the photograph in non-volatile memory. Later, a user of the digital camera may view the photograph by having the digital camera read the photograph from the non-volatile memory. Because users often rely on the data they store, it is important to users of non-volatile memory to be able to store data reliably so that it can be read back successfully.

BRIEF DESCRIPTION OF THE DRAWINGS

Like-numbered elements refer to common components in the different figures.

FIGS. 5A-5F depict examples of threshold voltage distributions.

DETAILED DESCRIPTION

For non-volatile memory devices, it is important to test the devices to ensure their proper operation. These tests can be performed by use of external testing devices or internal test circuits, or built-in self-test circuitry. One component of a non-volatile memory device that needs to be tested is the data path between the input/output (IO) pads of a memory chip and the buffer memory used to store data to be written into or read out of a memory array. One set of tests on the data path can be high speed data path tests to determine whether the memory device can handle the transfer speed of user data transfer to and from the memory device. However, this requires data path testing based on a high speed test clock which may not be suitable for other test modes, such as setting trim values. To address this issue, the following presents testing techniques and circuitry for data path testing having multiple modes, in which the frequency of the test clock signal is divided by differing amounts depending on the test selected.

Figure 1:
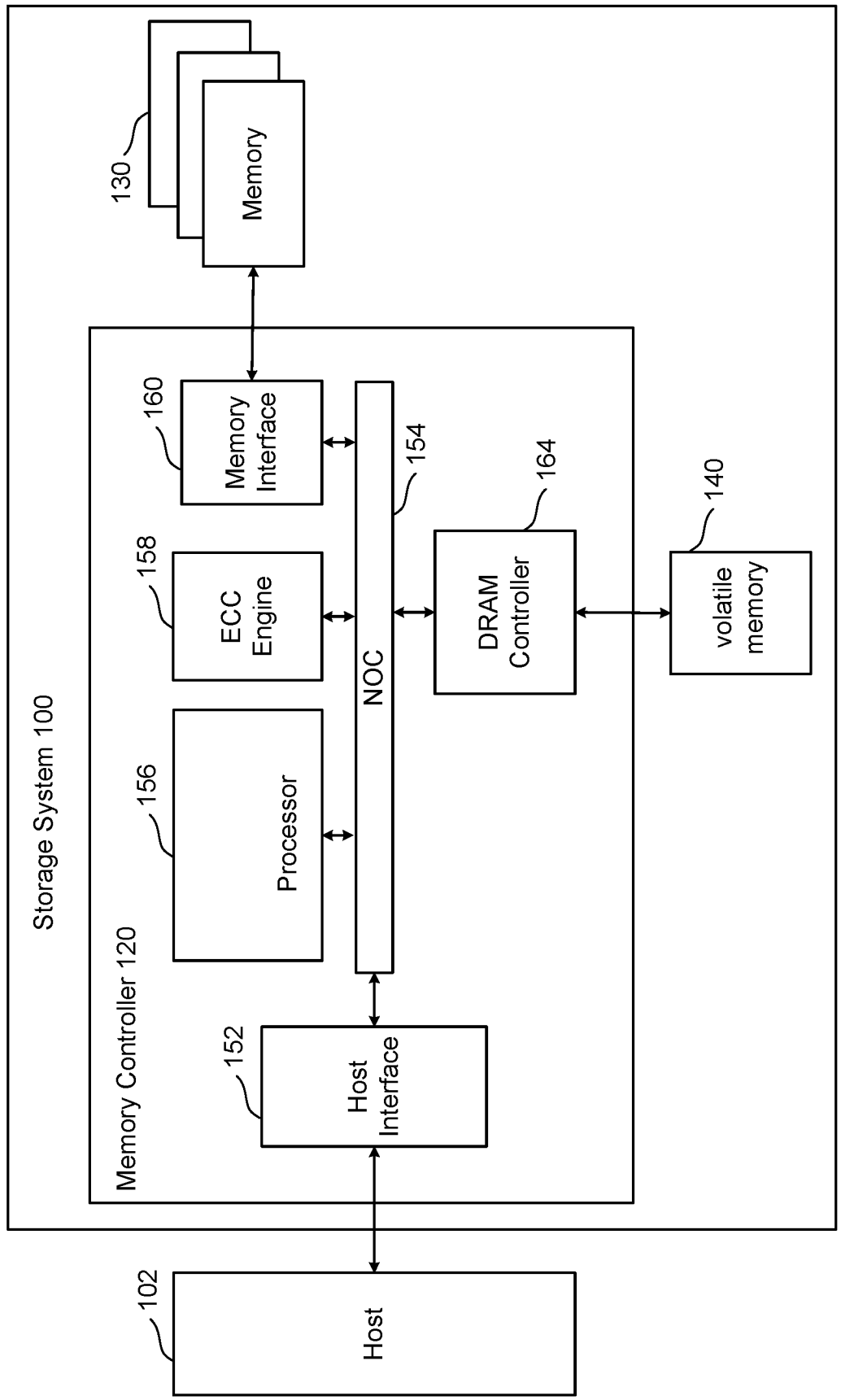
FIG. 1 is a block diagram depicting one embodiment of a storage system.

The components of storage system 100 depicted in FIG. 1 are electrical circuits. Storage system 100 includes a memory controller 120 connected to non-volatile memory 130 and local high speed volatile memory 140 (e.g., DRAM). Local high speed volatile memory 140 is used by memory controller 120 to perform certain functions. For example, local high speed volatile memory 140 stores logical to physical address translation tables ("L2P tables").

Memory controller 120 comprises a host interface 152 that is connected to and in communication with host 102. In one embodiment, host interface 152 implements a NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and DRAM controller 164. DRAM controller 164 is used to operate and communicate with local high speed volatile memory 140 (e.g., DRAM). In other embodiments, local high speed volatile memory 140 can be SRAM or another type of volatile memory.

ECC engine 158 performs error correction services. For example, ECC engine 158 performs data encoding and decoding, as per the implemented ECC technique. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory dies. One example implementation is to maintain tables (i.e., the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a memory die 130 and a subset of the L2P tables are cached (L2P cache) in the local high speed volatile memory 140.

Memory interface 160 communicates with non-volatile memory 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
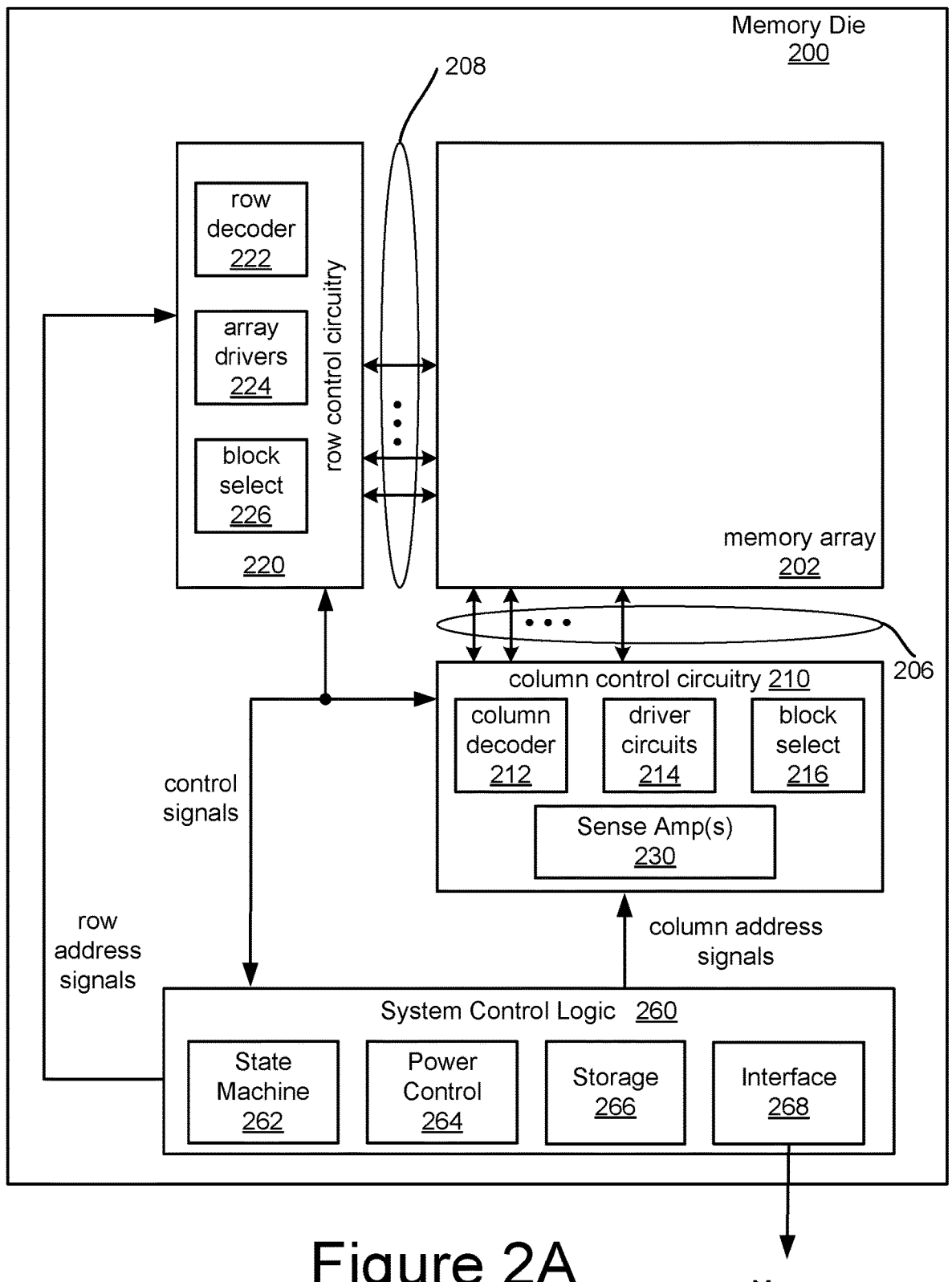
FIG. 2A is a block diagram of one embodiment of a memory die.

In one embodiment, non-volatile memory 130 comprises one or more memory die. FIG. 2A is a functional block diagram of one embodiment of a memory die 200 that comprises non-volatile memory 130. Each of the one or more memory die of non-volatile memory 130 can be implemented as memory die 200 of FIG. 2A. The components depicted in FIG. 2A are electrical circuits. Memory die 200 includes a memory array 202 that can comprise non-volatile memory cells, as described in more detail below. The array terminal lines of memory array 202 include the various layer(s) of word lines organized as rows, and the various layer(s) of bit lines organized as columns. However, other orientations can also be implemented. Memory die 200 includes row control circuitry 220, whose outputs 208 are connected to respective word lines of the memory array 202. Row control circuitry 220 receives a group of M row address signals and one or more various control signals from System Control Logic circuit 260, and typically may include such circuits as row decoders 222, array terminal drivers 224, and block select circuitry 226 for both reading and writing (programming) operations. Row control circuitry 220 may also include read/write circuitry. Memory die 200 also includes column control circuitry 210 including sense amplifier(s) 230 whose input/outputs 206 are connected to respective bit lines of the memory array 202. Although only single block is shown for array 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, block select circuitry 216, as well as read/write circuitry, and IO multiplexers.

System control logic 260 receives data and commands from memory controller 120 and provides output data and status to the host. In some embodiments, the system control logic 260 (which comprises one or more electrical circuits) include state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations and may include charge pumps and regulator circuit for creating regulating voltages. System control logic 260 includes storage 266 (e.g., RAM, registers, latches, etc.), which may be used to store parameters for operating the memory array 202.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other IO interfaces can also be used.

In some embodiments, all the elements of memory die 200, including the system control logic 360, can be formed as part of a single die. In other embodiments, some or all of the system control logic 260 can be formed on a different die.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the components depicted in FIG. 2A other than memory structure 202. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more die, such as two memory die and one control die, for example.

Figure 2B:
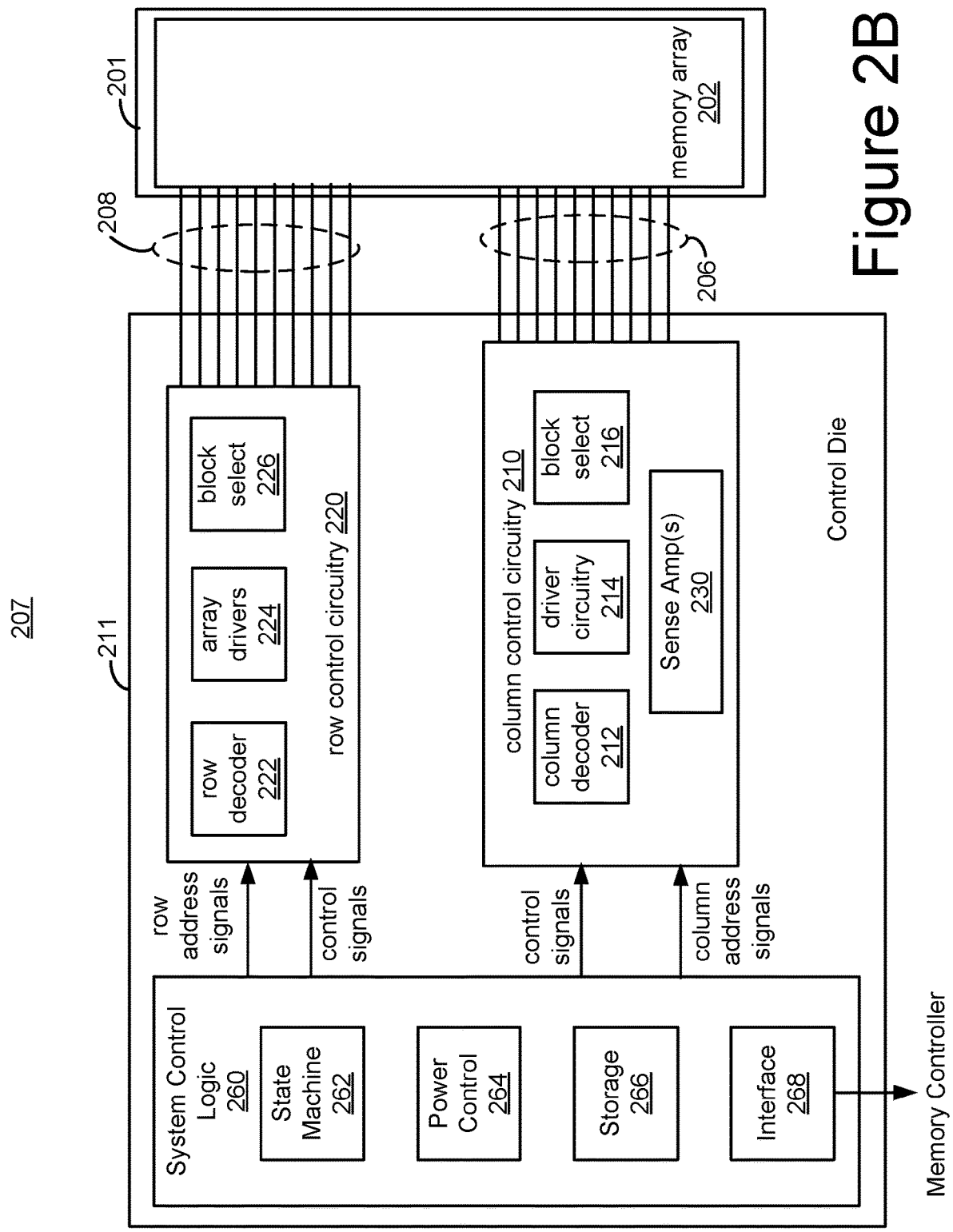
FIG. 2B is a block diagram of one embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile memory 130 of storage system 100. The integrated memory assembly 307 includes two types of semiconductor die (or more succinctly, "die"). Memory die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory die 201. In some embodiments, the memory die 201 and the control die 211 are bonded together.

FIG. 2B shows an example of the peripheral circuitry, including control circuits, formed in a peripheral circuit or control die 311 coupled to memory structure 202 formed in memory die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory die 201. In some embodiments, some of the circuitry in the system control logic 260 is located on the on the memory die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory 2 die 201 may reduce the number of steps needed to fabricate such a die, adding such circuits to a die such as control die 311 may not require many additional process steps. The control die 211 could also be referred to as a CMOS die, due to the use of CMOS technology to implement some or all of control circuitry 260, 210, 220.

FIG. 2B shows column control circuitry 210 including sense amplifier(s) 230 on the control die 211 coupled to memory structure 202 on the memory die 201 through electrical paths 206. For example, electrical paths 206 may provide electrical connection between column decoder 212, driver circuitry 214, and block select 216 and bit lines of memory structure 202. Electrical paths may extend from column control circuitry 210 in control die 211 through pads on control die 211 that are bonded to corresponding pads of the memory die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each of electrical path 208 may correspond to a word line, dummy word line, or select gate line. Additional electrical paths may also be provided between control die 211 and memory die 201.

For purposes of this document, the phrases "a control circuit" or "one or more control circuits" can include any one of or any combination of memory controller 120, state machine 262, all or a portion of system control logic 260, all or a portion of row control circuitry 220, all or a portion of column control circuitry 210, a microcontroller, a microprocessor, and/or other similar functioned circuits. The control circuit can include hardware only or a combination of hardware and software (including firmware). For example, a controller programmed by firmware to perform the functions described herein is one example of a control circuit. A control circuit can include a processor, FGA, ASIC, integrated circuit, or other type of circuit. In some embodiments, there is more than one control die 211 and more than one memory die 201 in an integrated memory assembly 207. In some embodiments, the integrated memory assembly 207 includes a stack of multiple control die 211 and multiple memory die 201.

Figure 3:
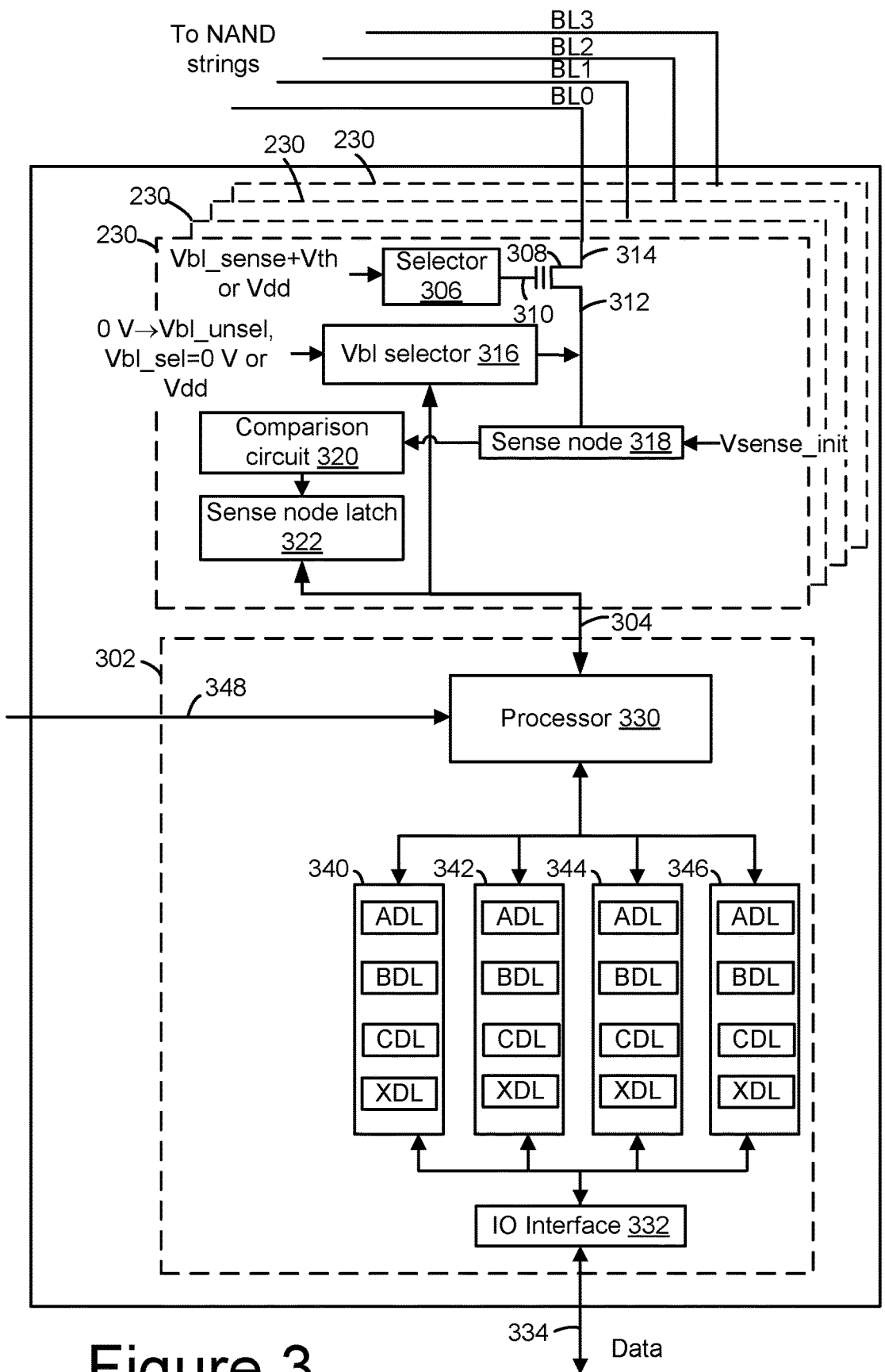
FIG. 3 depicts circuitry used to sense data from non-volatile memory.

FIG. 3 is a block diagram depicting one embodiment of a portion of column control circuitry 210 that is partitioned into a plurality of sense amplifiers 230, and a common portion, referred to as a managing circuit 302. In one embodiment, each sense amplifier 230 is connected to a respective bit line which in turn is connected to one or more NAND strings. In one example implementation, each bit line is connected to six NAND strings, with one NAND string per sub-block. Managing circuit 302 is connected to a set of multiple (e.g., four, eight, etc.) sense amplifiers 230. Each of the sense amplifiers 230 in a group communicates with the associated managing circuit via data bus 304.

Each sense amplifier 230 operates to provide voltages to bit lines (see BL0, BL1, BL2, BL3) during program, verify, erase and read operations. Sense amplifiers are also used to sense the condition (e.g., data state) to a memory cells in a NAND string connected to the bit line that connects to the respective sense amplifier.

Each sense amplifier 230 includes a selector 306 or switch connected to a transistor 308 (e.g., an NMOS). Based on voltages at the control gate 310 and drain 312 of the transistor 308, the transistor can operate as a pass gate or as a bit line clamp. When the voltage at the control gate is sufficiently higher than the voltage on the drain, the transistor operates as a pass gate to pass the voltage at the drain to the bit line (BL) at the source 314 of the transistor. For example, a program-inhibit voltage such as 1-2 V may be passed when pre-charging and inhibiting an unselected NAND string. Or, a program-enable voltage such as 0 V may be passed to allow programming in a selected NAND string. The selector 306 may pass a power supply voltage Vdd, (e.g., 3-4 V) to the control gate of the transistor 308 to cause it to operate as a pass gate.

When the voltage at the control gate is lower than the voltage on the drain, the transistor 308 operates as a source-follower to set or clamp the bit line voltage at Vcg-Vth, where Vcg is the voltage on the control gate 310 and Vth, e.g., 0.7 V, is the threshold voltage of the transistor 308. This assumes the source line is at 0 V. If Vcelsrc is non-zero, the bit line voltage is clamped at Vcg-Vcelsrc-Vth. The transistor is therefore sometimes referred to as a bit line clamp (BLC) transistor, and the voltage Vcg on the control gate 310 is referred to as a bit line clamp voltage, Vblc. This mode can be used during sensing operations such as read and verify operations. The bit line voltage is thus set by the transistor 308 based on the voltage output by the selector 306. For example, the selector 306 may pass Vsense+Vth, e.g., 1.5 V, to the control gate of the transistor 308 to provide Vsense, e.g., 0.8 V, on the bit line. A Vbl selector 316 may pass a relatively high voltage such as Vdd to the drain 312, which is higher than the control gate voltage on the transistor 308, to provide the source-follower mode during sensing operations. Vbl refers to the bit line voltage.

The Vbl selector 316 can pass one of a number of voltage signals. For example, the Vbl selector can pass a program-inhibit voltage signal which increases from an initial voltage, e.g., 0 V, to a program inhibit voltage, e.g., Vbl_inh for respective bit lines of unselected NAND string during a program loop. The Vbl selector 316 can pass a program-enable voltage signal such as 0 V for respective bit lines of selected NAND strings during a program loop.

In one approach, the selector 306 of each sense circuit can be controlled separately from the selectors of other sense circuits. The Vbl selector 316 of each sense circuit can also be controlled separately from the Vbl selectors of other sense circuits.

During sensing, a sense node 318 is charged up to an initial voltage, Vsense_init, such as 3 V. The sense node is then passed to the bit line via the transistor 308, and an amount of decay of the sense node is used to determine whether a memory cell is in a conductive or non-conductive state. The amount of decay of the sense node also indicates whether a current Icell in the memory cell exceeds a reference current, Iref. A larger decay corresponds to a larger current. If Icell≤Iref, the memory cell is in a non-conductive state and if Icell>Iref, the memory cell is in a conductive state.

In particular, the comparison circuit 320 determines the amount of decay by comparing the sense node voltage to a trip voltage at a sense time. If the sense node voltage decays below the trip voltage, Vtrip, the memory cell is in a conductive state and its Vth is at or below the verify voltage. If the sense node voltage does not decay below Vtrip, the memory cell is in a non-conductive state and its Vth is above the verify voltage. A sense node latch 322 is set to 0 or 1, for example, by the comparison circuit 320 based on whether the memory cell is in a conductive or non-conductive state, respectively. For example, in a program-verify test, a 0 can denote fail and a 1 can denote pass. The bit in the sense node latch can be read out in a state bit scan operation of a scan operation or flipped from 0 to 1 in a fill operation. The bit in the sense node latch 322 can also be used in a lockout scan to decide whether to set a bit line voltage to an inhibit or program level in a next program loop. L Managing circuit 302 comprises a processor 330, four example sets of data latches 340, 342, 344 and 346, and an IO interface 332 coupled between the sets of data latches and the data bus 334. FIG. 3 shows four example sets of data latches 340, 342, 344 and 346; however, in other embodiments more or less than four can be implemented. In one embodiment, there is one set of latches for each sense amplifier 230. One set of three data latches, e.g., comprising individual latches ADL, BDL, CDL and XDL, can be provided for each sense circuit. In some cases, a different number of data latches may be used. In a three bit per memory cell embodiment, ADL stores a bit for a lower page of data, BDL stores a bit for a middle page of data, CDL stores a bit for an upper page of data and XDL serves as an interface latch for storing/latching data from the memory controller.

Processor 330 performs computations, such as to determine the data stored in the sensed memory cell and store the determined data in the set of data latches. Each set of data latches 340-346 is used to store data bits determined by processor 330 during a read operation, and to store data bits imported from the data bus 334 during a program operation which represent write data meant to be programmed into the memory. IO interface 332 provides an interface between data latches 340-346 and the data bus 334.

During reading, the operation of the system is under the control of state machine 262 that controls the supply of different control gate voltages to the addressed memory cell. As it steps through the various predefined control gate voltages corresponding to the various memory states supported by the memory, the sense circuit may trip at one of these voltages and a corresponding output will be provided from the sense amplifier to processor 330 via the data bus 304. At that point, processor 330 determines the resultant memory state by consideration of the tripping event(s) of the sense circuit and the information about the applied control gate voltage from the state machine via input lines 348. It then computes a binary encoding for the memory state and stores the resultant data bits into data latches 340-346.

Some implementations can include multiple processors 330. In one embodiment, each processor 330 will include an output line (not depicted) such that each of the output lines is connected in a wired-OR connection. A wired OR connection or line can be provided by connecting multiple wires together at a node, where each wire carries a high or low input signal from a respective processor, and an output of the node is high if any of the input signals is high. In some embodiments, the output lines are inverted prior to being connected to the wired-OR line. This configuration enables a quick determination during a program verify test of when the programming process has completed because the state machine receiving the wired-OR can determine when all bits being programmed have reached the desired level. For example, when each bit has reached its desired level, a logic zero for that bit will be sent to the wired-OR line (or a data one is inverted). When all bits output a data 0 (or a data one inverted), then the state machine knows to terminate the programming process. Because each processor communicates with eight sense circuits, the state machine needs to read the wired-OR line eight times, or logic is added to processor 330 to accumulate the results of the associated bit lines such that the state machine need only read the wired-OR line one time. Similarly, by choosing the logic levels correctly, the global state machine can detect when the first bit changes its state and change the algorithms accordingly.

During program or verify operations for memory cells, the data to be programmed (write data) is stored in the set of data latches 340-346 from the data bus 334. During reprogramming, a respective set of data latches of a memory cell can store data indicating when to enable the memory cell for reprogramming based on the program pulse magnitude.

The program operation, under the control of the state machine 262, applies a series of programming voltage pulses to the control gates of the addressed memory cells. Each voltage pulse may be stepped up in magnitude from a previous program pulse by a step size in a process referred to as incremental step pulse programming. Each program voltage is followed by a verify operation to determine if the memory cells has been programmed to the desired memory state. In some cases, processor 330 monitors the read back memory state relative to the desired memory state. When the two are in agreement, processor 330 sets the bit line in a program inhibit mode such as by updating its latches. This inhibits the memory cell coupled to the bit line from further programming even if additional program pulses are applied to its control gate.

Figure 4:
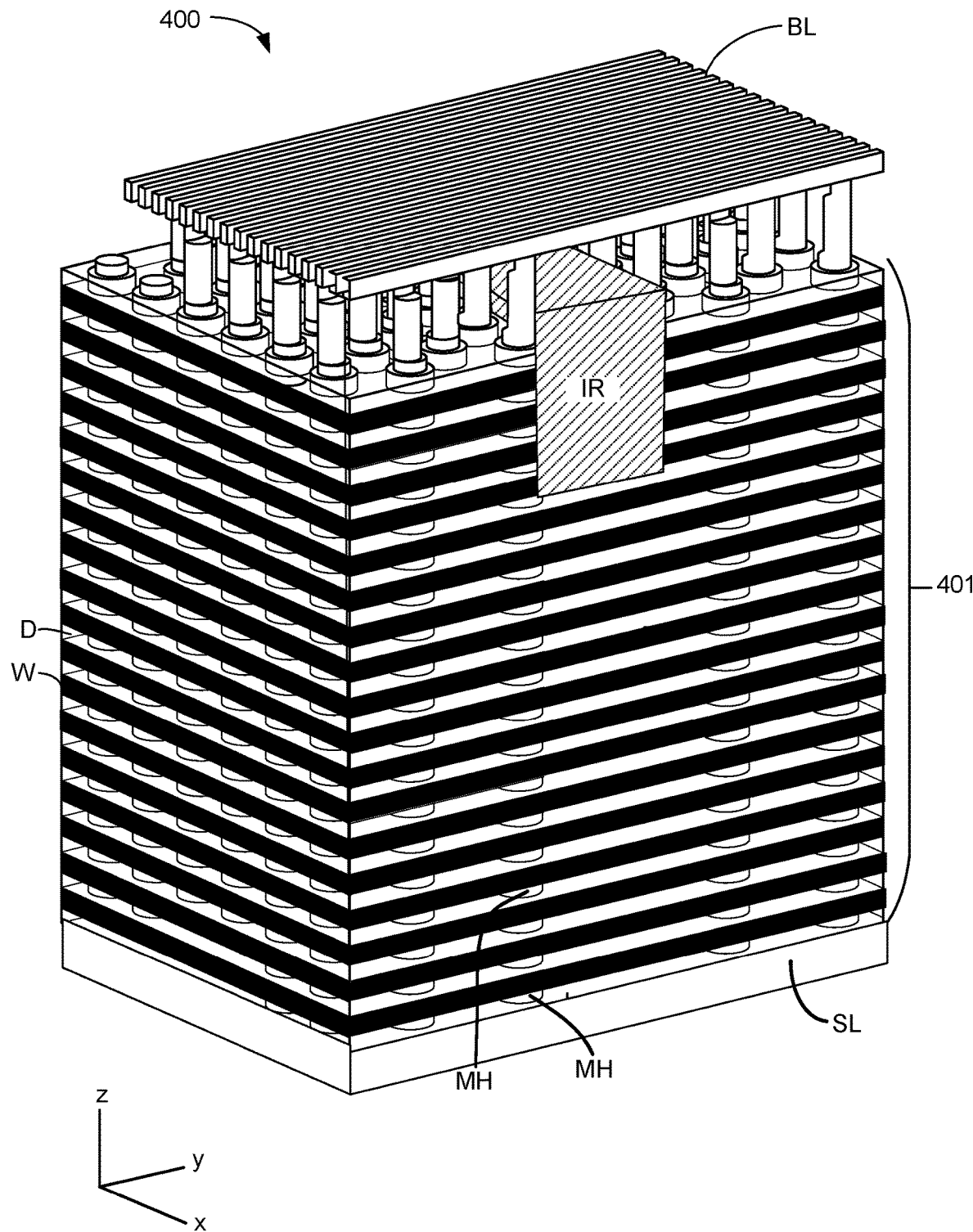
FIG. 4 is a perspective view of a portion of one embodiment of a monolithic three dimensional memory structure.

FIG. 4 is a perspective view of a portion of one example embodiment of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. As will be explained below, in one embodiment the alternating dielectric layers and conductive layers are divided into six (or a different number of) regions (e.g., sub-blocks) by isolation regions IR. FIG. 4 shows one isolation region IR separating two sub-blocks. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

Figure 4A:
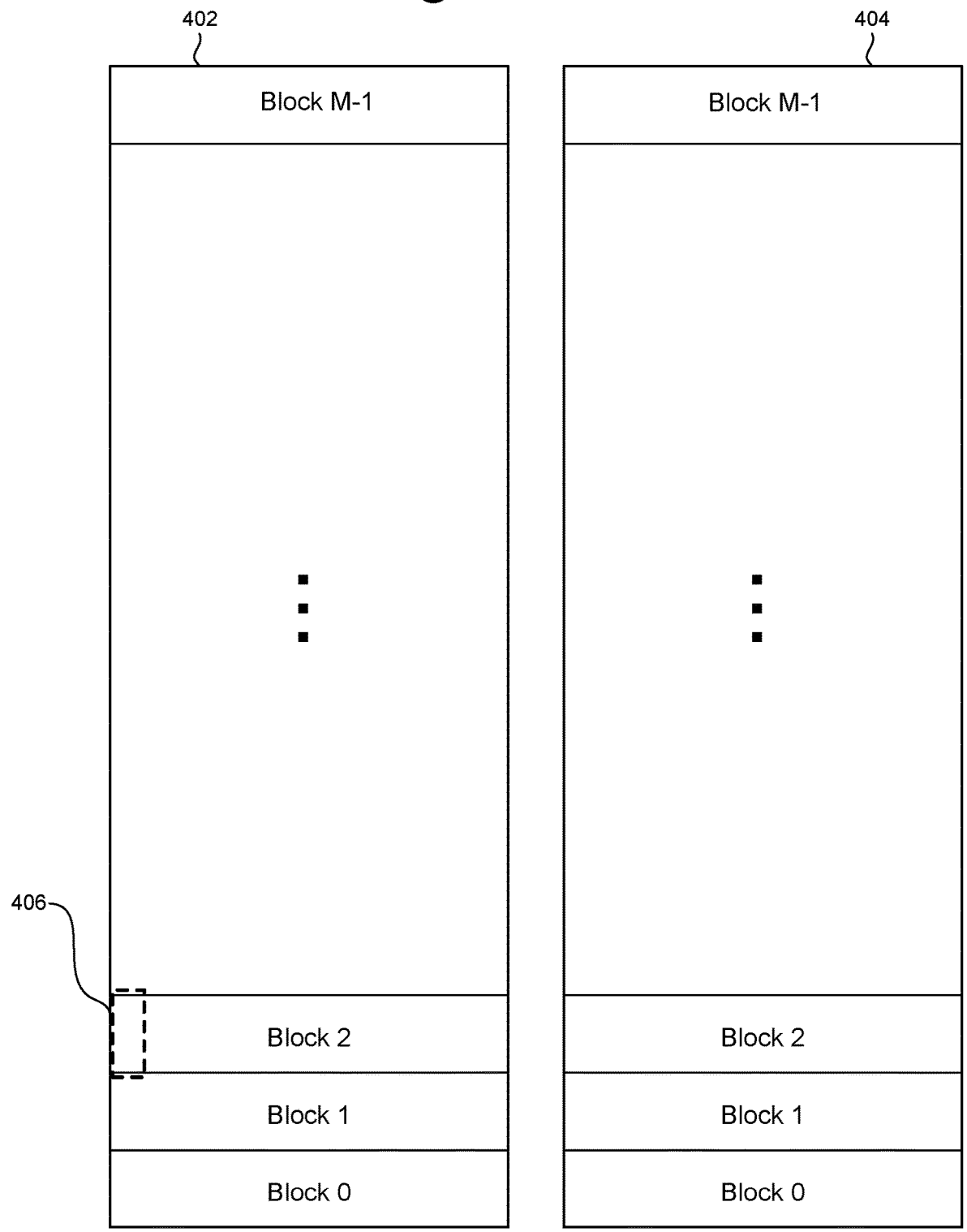
FIG. 4A is a block diagram of one embodiment of a memory structure having two planes.

FIG. 4A is a block diagram explaining one example organization of memory structure 202, which is divided into two planes 402 and 404. Each plane is then divided into M blocks. In one example, each plane has about 2000 blocks. However, different numbers of blocks and planes can also be used. In one embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In some embodiments, a block represents a groups of connected memory cells as the memory cells of a block share a common set of word lines. For example, the word lines for a block are all connected to all of the vertical NAND strings for that block. Although FIG. 4A shows two planes 402/404, more or less than two planes can be implemented. In some embodiments, memory structure 202 includes eight planes.

Figure 4B:
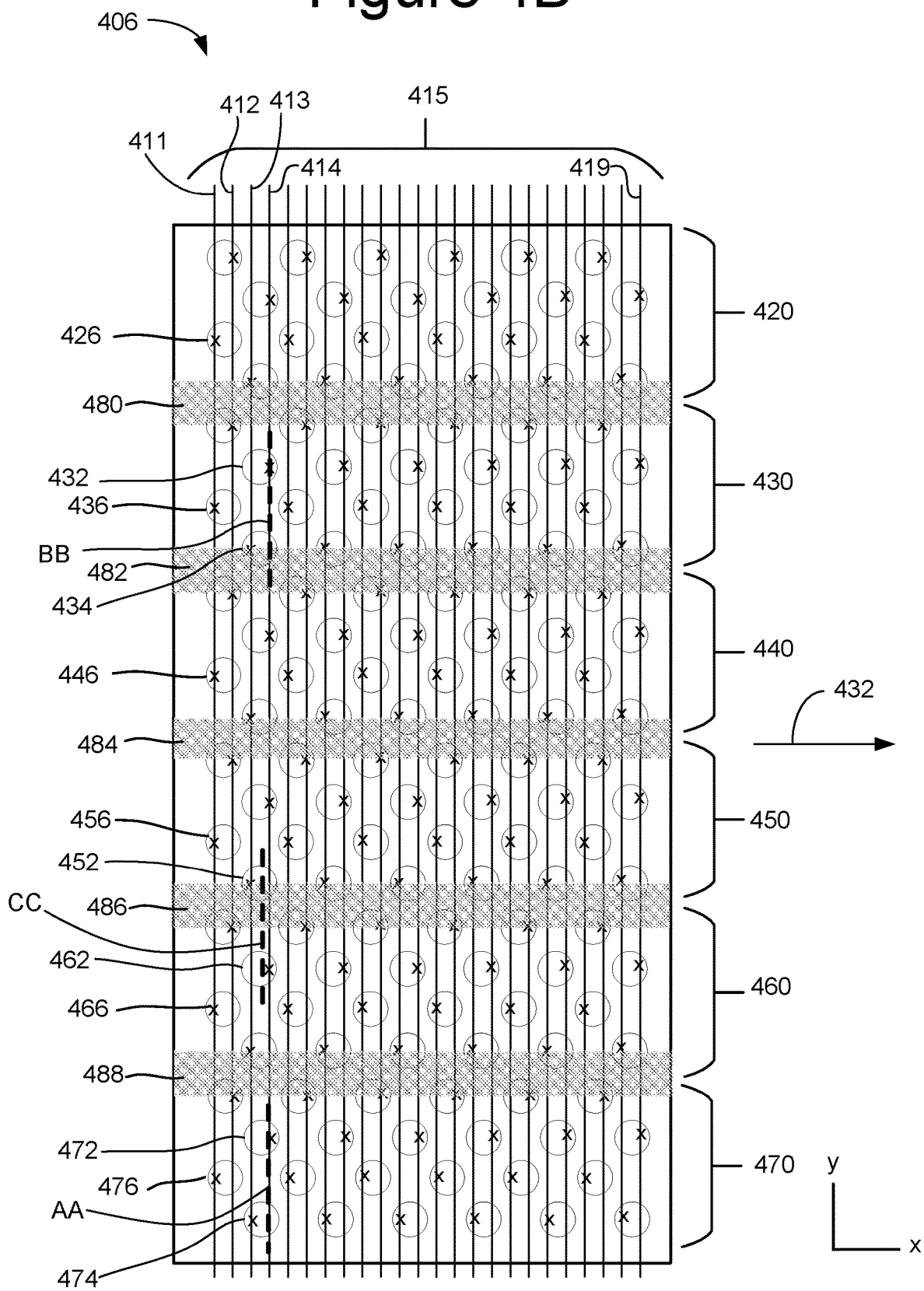
FIGS. 4B-4G more detail for the embodiment of FIG. 4.

FIGS. 4B-4G depict an example three dimensional ("3D") NAND structure that corresponds to the structure of FIG. 4 and can be used to implement memory structure 202 of FIGS. 2A and 2B. FIG. 4B is a block diagram depicting a top view of a portion 406 of Block 2 of plane 402. As can be seen from FIG. 4B, the block depicted in FIG. 4B extends in the direction of 432. In one embodiment, the memory array has many layers; however, FIG. 4B only shows the top layer.

FIG. 4B depicts a plurality of circles that represent the vertical columns, which correspond to the memory holes. Each of the vertical columns include multiple select transistors (also referred to as a select gate or selection gate) and multiple memory cells. In one embodiment, each vertical column implements a NAND string. For example, FIG. 4B labels a subset of the vertical columns/NAND strings 426, 432, 436, 446, 456, 462, 466, 472, 474 and 476.

FIG. 4B also depicts a set of bit lines 415, including bit lines 411, 412, 413, 414, . . . 419. FIG. 4B shows twenty four bit lines because only a portion of the block is depicted. It is contemplated that more than twenty four bit lines may be connected to vertical columns of the block. Each of the circles representing vertical columns has an "x" to indicate its connection to one bit line. For example, bit line 411 is connected to vertical columns 426, 436, 446, 456, 466 and 476.

The block depicted in FIG. 4B includes a set of isolation regions 480, 482, 484, 486 and 488, which are formed of $SiO_2$; however, other dielectric materials can also be used. Isolation regions 480, 482, 484, 486 and 488 serve to divide the top layers of the block into six regions; for example, the top layer depicted in FIG. 4B is divided into regions 420, 430, 440, 450, 460 and 470 all of which are referred to as sub-blocks. In one embodiment, the isolation regions only divide the layers used to implement select gates so that NAND strings in different sub-blocks can be independently selected. In one example implementation, a bit line only connects to one vertical column/NAND string in each of regions (sub-blocks) 420, 430, 440, 450, 460 and 470. In that implementation, each block has twenty-four rows of active columns and each bit line connects to six rows in each block. In one embodiment, all of the six vertical columns/NAND strings connected to a common bit line are connected to the same word line (or set of word lines). Therefore, the system uses the drain side selection lines to choose one (or another subset) of the six to be subjected to a memory operation (program, verify, read, and/or erase).

Although FIG. 4B shows each region 420, 430, 440, 450, 460 and 470 having four rows of vertical columns, six regions and twenty four rows of vertical columns in a block, those exact numbers are an example implementation. Other embodiments may include more or less regions per block, more or less rows of vertical columns per region and more or less rows of vertical columns per block. FIG. 4B also shows the vertical columns being staggered. In other embodiments, different patterns of staggering can be used. In some embodiments, the vertical columns are not staggered.

Figure 4C:
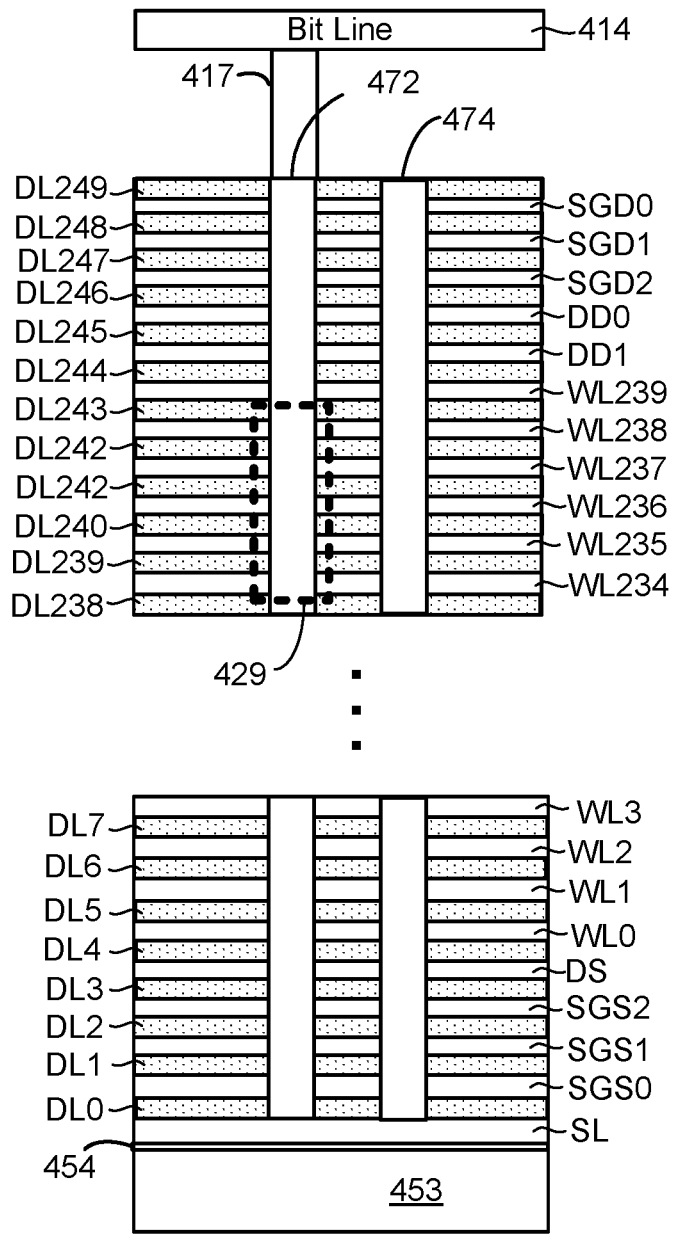

FIG. 4C depicts a portion of one embodiment of a three dimensional memory structure 202 showing a cross-sectional view along line AA of FIG. 4B. This cross sectional view cuts through vertical columns (NAND strings) 472 and 474 of region 470 (see FIG. 4B). The structure of FIG. 4C includes: three drain side select layers SGD0, SGD1 and SGD2; three source side select layers SGS0, SGS1, and SGS2; three dummy word line layers DD0, DD1, and DDS; two hundred and forty word line layers WL0-WL239 for connecting to data memory cells; and two hundred and fifty dielectric layers D10-DL249. Other embodiments can implement more or less than the numbers described above for FIG. 4C. In one embodiment, SGD0, SGD1 and SGD2 are connected together, and SGDS0, SGS1 and SGS2 are connected together.

Vertical columns 472 and 474 are depicted protruding through the drain side select layers, source side select layers, dummy word line layers and word line layers. In one embodiment, each vertical column comprises a vertical NAND string. Below the vertical columns and the layers is substrate 453, an insulating film 454 on the substrate, and source line SL. The NAND string of vertical column 442 has a source end at a bottom of the stack and a drain end at a top of the stack. As in FIG. 4B, FIG. 4C shows vertical column 472 connected to bit line 414 via connector 417.

For ease of reference, drain side select layers, source side select layers, dummy word line layers, and data word line layers collectively are referred to as the conductive layers. In one embodiment, the conductive layers are made from a combination of TiN and Tungsten. In other embodiments, other materials can be used to form the conductive layers, such as doped polysilicon, metal such as tungsten or metal silicide. In some embodiments, different conductive layers can be formed from different materials. Between conductive layers are dielectric layers DL0-DL249. For example, dielectric layers DL240 is above word line layer WL235 and below word line layer WL236. In one embodiment, the dielectric layers are made from $SiO_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layers WL0-W239 connect to memory cells (also called data memory cells). Dummy word line layers DD0, DD1 and DS connect to dummy memory cells. A dummy memory cell does not store and is not eligible to store host data (data provided from the host or entity outside of the storage system 100), such as data from a user of the host), while a data memory cell is eligible to store host data. Host data can be contrasted with system data that is generated by memory system 100 (e.g., L2P tables). In some embodiments, data memory cells and dummy memory cells may have a same structure. Drain side select layers SGD0, SGD1, and SGD2 are used to electrically connect and disconnect NAND strings from bit lines. Source side select layers SGS0, SGS1, and SGS2 are used to electrically connect and disconnect NAND strings from the source line SL.

Note that the stack of word lines WL0-WL239 include two edge word lines at the edges of the stack, including top edge word line WL239 and bottom edge word line WL0. Word lines WL1-WL238 are non-edge word lines.

Figure 4D:
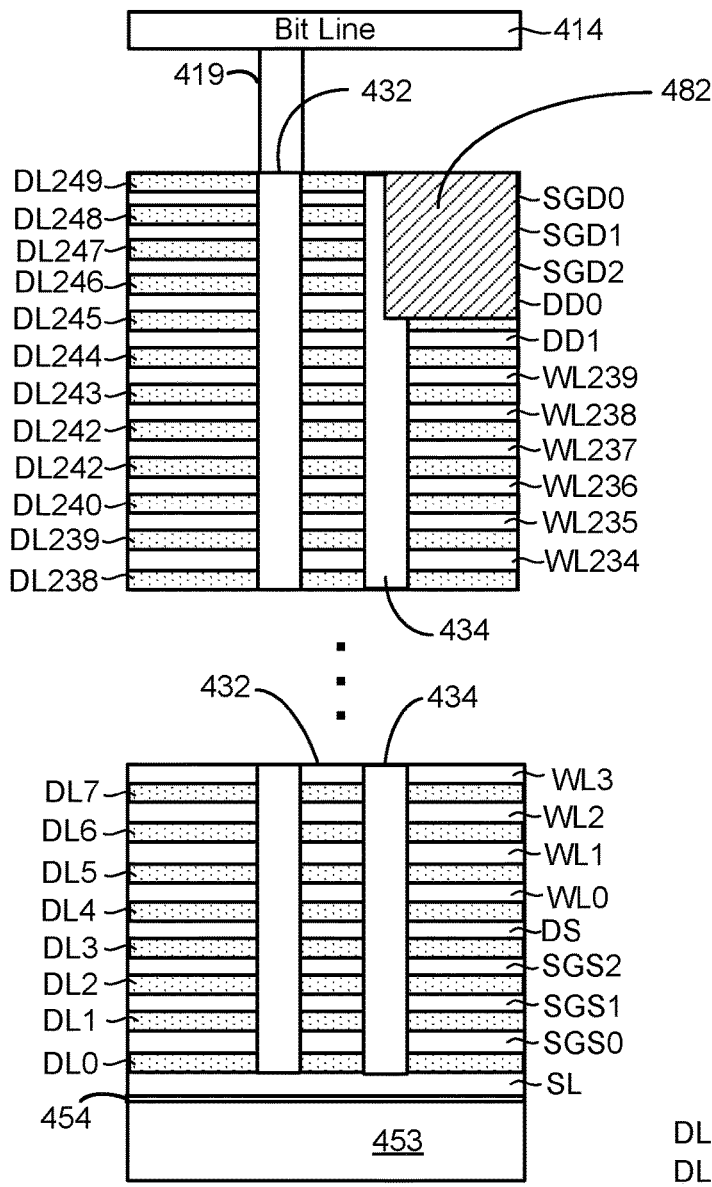

FIG. 4D depicts a portion of one embodiment of a three dimensional memory structure 202 showing a cross-sectional view along line BB of FIG. 4B. This cross sectional view cuts through vertical columns (NAND strings) 432 and 434 of region 430 (see FIG. 4B). FIG. 4D shows the same alternating conductive and dielectric layers as FIG. 4C. FIG. 4D also shows isolation region 482. Isolation regions 480, 482, 484, 486 and 488 occupy space that would have been used for a portion of the memory holes/vertical columns/NAND stings. For example, isolation region 482 occupies space that would have been used for a portion of vertical column 434. More specifically, a portion (e.g., half the diameter) of vertical column 434 has been removed in layers SDG0, SGD1, SGD2, and DD0 to accommodate isolation region 482. Thus, while most of the vertical column 434 is cylindrical (with a circular cross section), the portion of vertical column 434 in layers SDG0, SGD1, SGD2, and DD0 has a semi-circular cross section. In one embodiment, after the stack of alternating conductive and dielectric layers is formed, the stack is etched to create space for the isolation region and that space is then filled in with SiO$_2$.

Figure 4E:
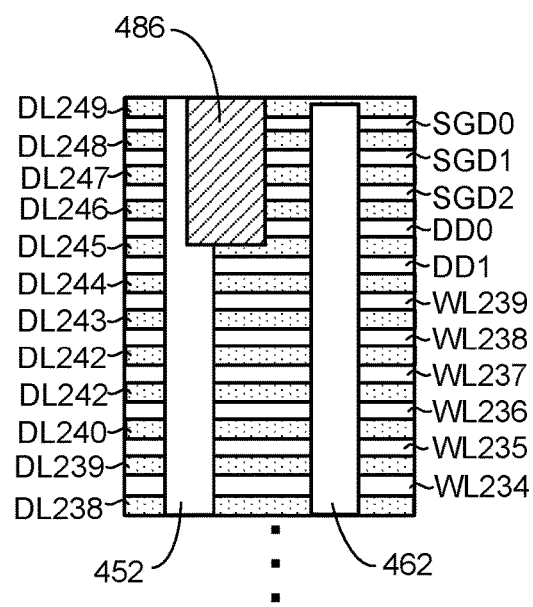

FIG. 4E depicts a portion of one embodiment of a three dimensional memory structure 202 showing a cross-sectional view along line CC of FIG. 4B. This cross sectional view cuts through vertical columns (NAND strings) 452 and 462 (see FIG. 4B). FIG. 4E shows the same alternating conductive and dielectric layers as FIG. 4C. FIG. 4E also shows isolation region 486 cutting into vertical columns (NAND string) 452.

Figure 4F:
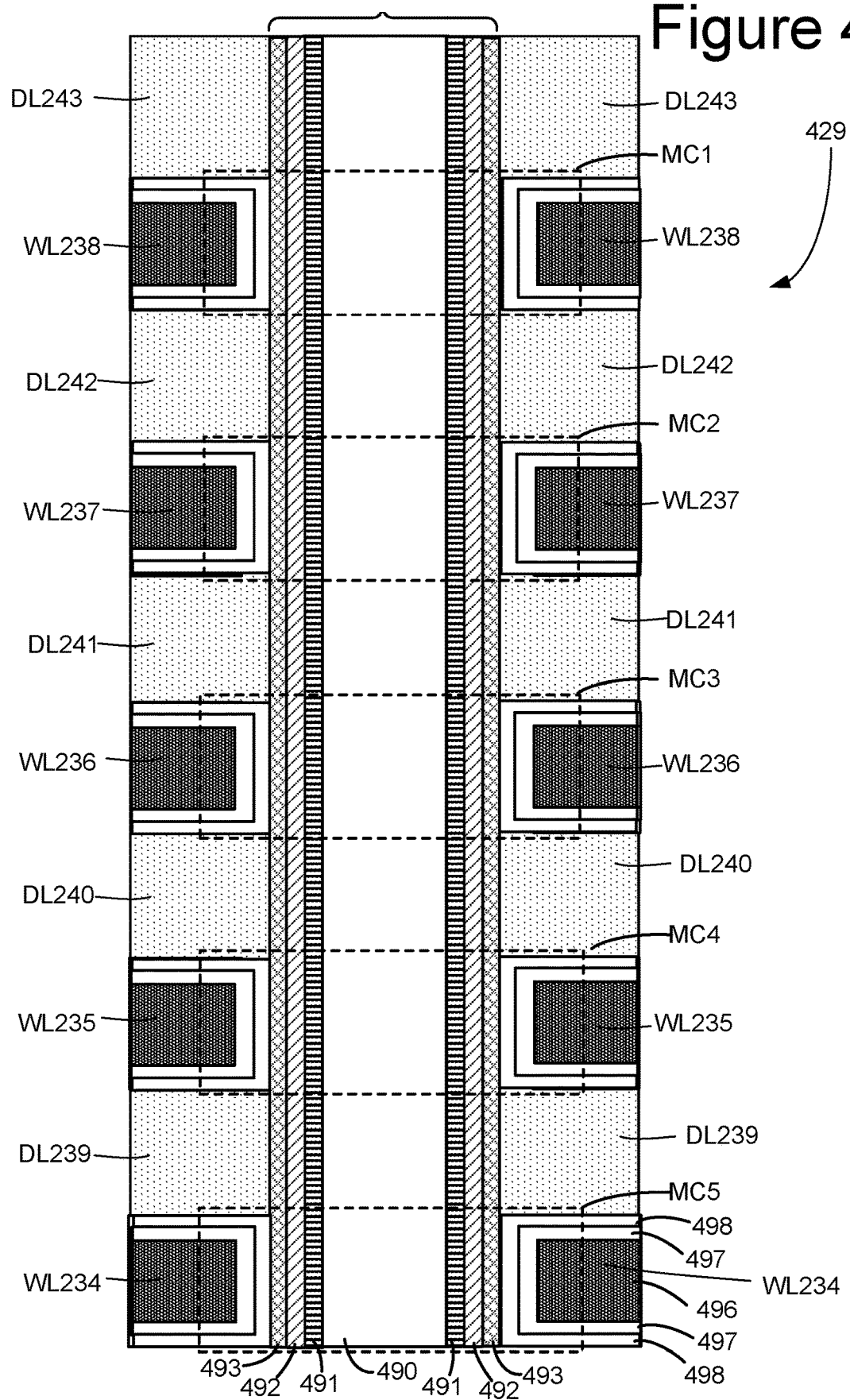

FIG. 4F depicts a cross sectional view of region 429 of FIG. 4C that includes a portion of vertical column 472. In one embodiment, the vertical columns are round; however, in other embodiments other shapes can be used. In one embodiment, vertical column 472 includes an inner core layer 490 that is made of a dielectric, such as SiO$_2$. Other materials can also be used. Surrounding inner core 490 is polysilicon channel 491. Materials other than polysilicon can also be used. Note that it is the channel 491 that connects to the bit line and the source line. Surrounding channel 491 is a tunneling dielectric 492. In one embodiment, tunneling dielectric 492 has an ONO structure. Surrounding tunneling dielectric 492 is charge trapping layer 493, such as (for example) silicon nitride. Other memory materials and structures can also be used. The technology described herein is not limited to any particular material or structure.

FIG. 4D depicts dielectric layers DLL239, DLL240, DLL241, DLL242 and DLL243, as well as word line layers WLL234, WLL235, WLL236, WLL237, and WLL238. Each of the word line layers includes a word line region 496 surrounded by an aluminum oxide layer 497, which is surrounded by a blocking oxide layer 498. In other embodiments, the blocking oxide layer can be a vertical layer parallel and adjacent to charge trapping layer 493. The physical interaction of the word line layers with the vertical column forms the memory cells. Thus, a memory cell, in one embodiment, comprises channel 491, tunneling dielectric 492, charge trapping layer 493, blocking oxide layer 498, aluminum oxide layer 497 and word line region 496. For example, word line layer WLL238 and a portion of vertical column 472 comprise a memory cell MC1. Word line layer WLL237 and a portion of vertical column 472 comprise a memory cell MC2. Word line layer WLL236 and a portion of vertical column 472 comprise a memory cell MC3. Word line layer WLL235 and a portion of vertical column 472 comprise a memory cell MC4. Word line layer WLL234 and a portion of vertical column 472 comprise a memory cell MC5. In other architectures, a memory cell may have a different structure, however, the memory cell would still be the storage unit.

When a memory cell is programmed, electrons are stored in a portion of the charge trapping layer 493 which is associated with (e.g., in) the memory cell. These electrons are drawn into the charge trapping layer 493 from the channel 491, through the tunneling dielectric 492, in response to an appropriate voltage on word line region 496. The threshold voltage (Vth) of a memory cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as GIDL.

Figure 4G:
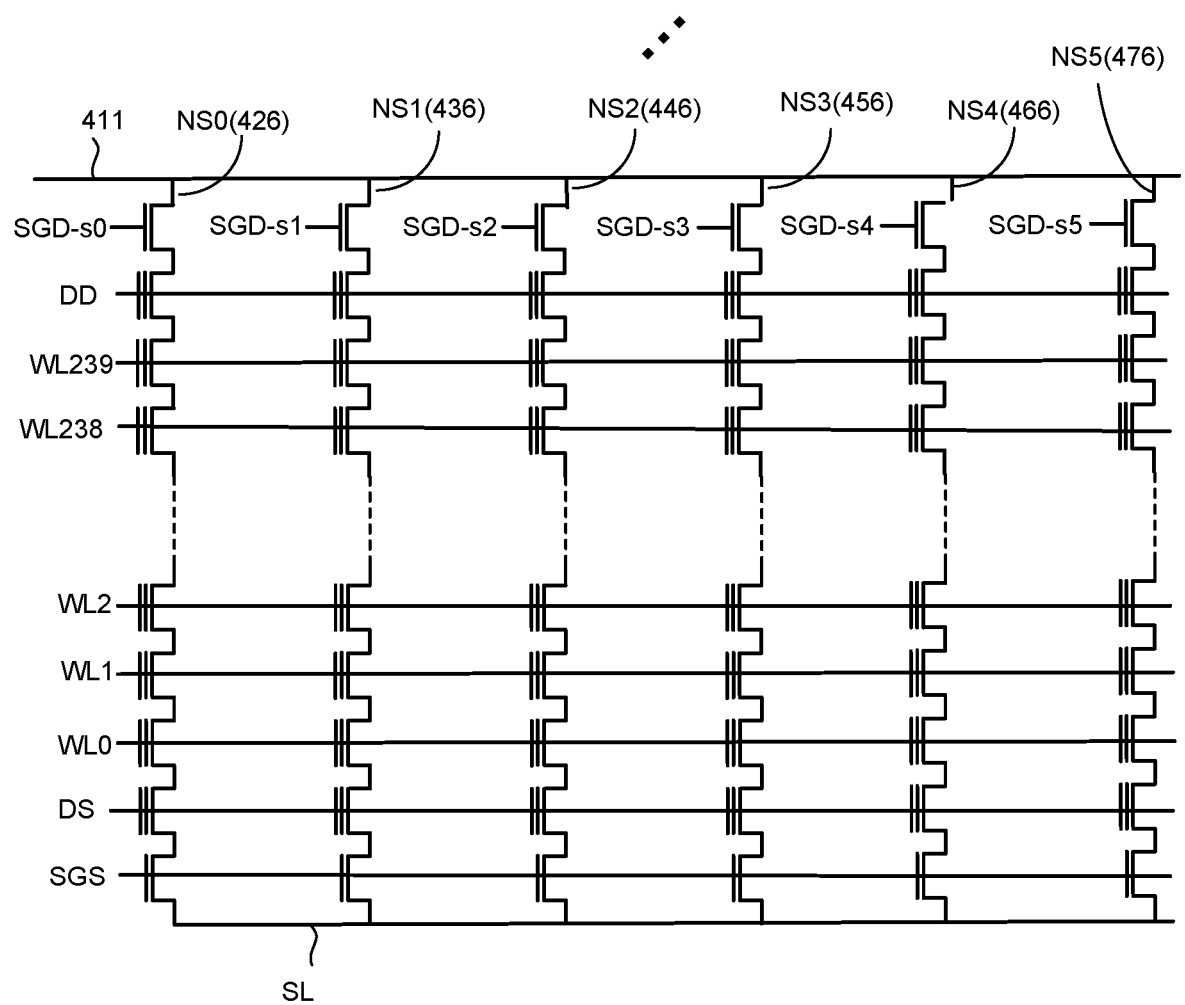

FIG. 4G is a schematic diagram of a portion of the memory array 202 depicted in in FIGS. 4-4F. FIG. 4G shows physical data word lines WL0-WL239 running across the entire block. The structure of FIG. 4G corresponds to a portion 306 in Block 2 of FIG. 4A, including bit line 411. Within the block, in one embodiment, each bit line is connected to six NAND strings. Thus, FIG. 4G shows bit line connected to NAND string NS0 (which corresponds to vertical column 426), NAND string NS1 (which corresponds to vertical column 436), NAND string NS2 (which corresponds to vertical column 446), NAND string NS3 (which corresponds to vertical column 456), NAND string NS4 (which corresponds to vertical column 466), and NAND string NS5 (which corresponds to vertical column 476). As mentioned above, in one embodiment, SGD0, SGD1 and SGD2 are connected together to operate as a single logical select gate for each sub-block separated by isolation regions (480, 482, 484, 486 and 486) to form SGD-s0, SGD-s1, SGD-s2, SGD-s3, SGD-s4, and SGD-s5. SGS0, SGl and SGS2 are also connected together to operate as a single logical select gate that is represented in FIG. 4E as SGS. Although the select gates SGD-s0, SGD-s1, SGD-s2, SGD-s3, SGD-s4, and SGD-s5 are isolated from each other due to the isolation regions, the data word lines WL0-WL239 of each sub-block are connected together.

The isolation regions (480, 482, 484, 486 and 486) are used to allow for separate control of sub-blocks. A first sub-block corresponds to those vertical NAND strings controlled by SGD-s0. A second sub-block corresponds to those vertical NAND strings controlled by SGD-s1. A third sub-block corresponds to those vertical NAND strings controlled by SGD-s2. A fourth sub-block corresponds to those vertical NAND strings controlled by SGD-s3. A fifth sub-block corresponds to those vertical NAND strings controlled by SGD-s4. A sixth sub-block corresponds to those vertical NAND strings controlled by SGD-s5.

FIG. 4G only shows the NAND strings connected to bit line 411. However, a full schematic of the block would show every bit line and six vertical NAND strings connected to each bit line.

Although the example memories of FIGS. 4-4G are three dimensional memory structure that includes vertical NAND strings with charge-trapping material, other (2D and 3D) memory structures can also be used with the technology described herein.

Figure 5A:
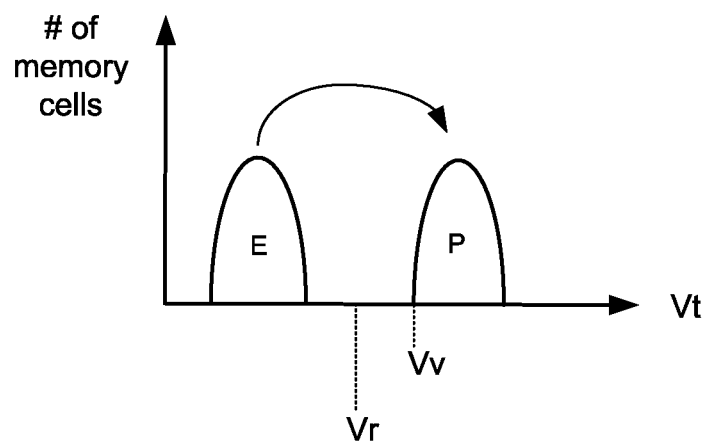

The memory systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate. FIG. 5A is a graph of threshold voltage versus number of memory cells, and illustrates example threshold voltage distributions for the memory array when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Data stored as one bit per memory cell is SLC data. FIG. 5A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 5A depicts read reference voltage Vr. By testing (e.g., performing one or more sense operations) whether the threshold voltage of a given memory cell is above or below Vr, the system can determine whether a memory cells is erased (state E) or programmed (state P). FIG. 5A also depicts verify reference voltage Vv. In some embodiments, when programming memory cells to data state P, the system will test whether those memory cells have a threshold voltage greater than or equal to Vv.

FIGS. 5B-F illustrate example threshold voltage distributions for the memory array when each memory cell stores multiple bit per memory cell data. Memory cells that store multiple bits per memory cell data are referred to as multilevel cells ("MLC"). The data stored in MLC memory cells is referred to as MLC data; therefore, MLC data comprises multiple bits per memory cell. Data stored as multiple bits of data per memory cell is MLC data. In the example embodiment of FIG. 5B, each memory cell stores two bits of data. Other embodiments may use other data capacities per memory cell (e.g., such as three, four, five or six bits of data per memory cell).

Figure 5B:
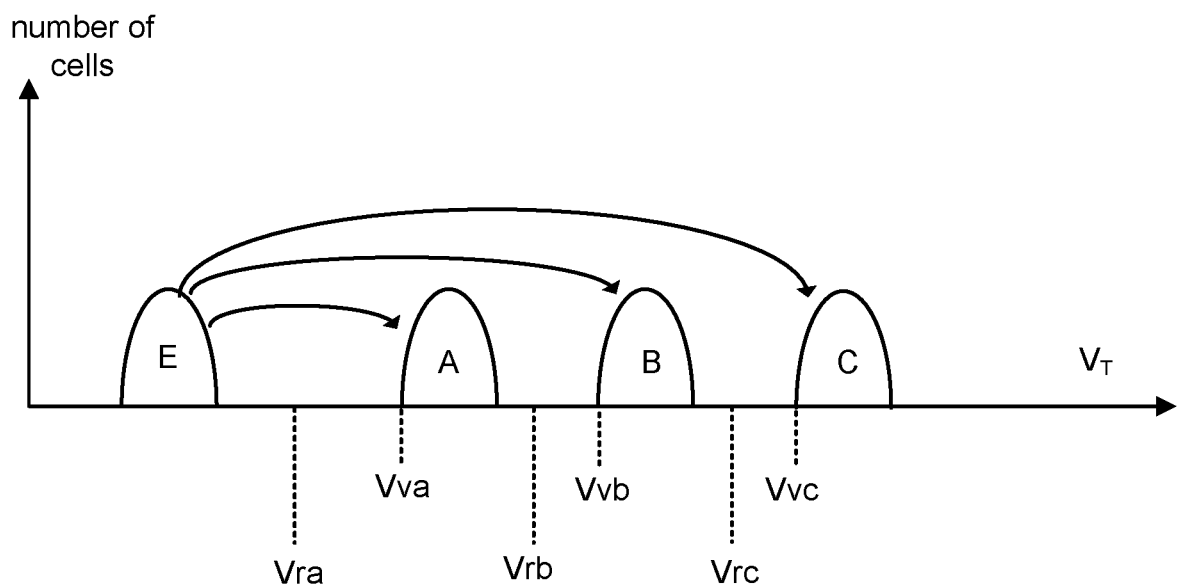

FIG. 5B shows a first threshold voltage distribution E for erased memory cells. Three threshold voltage distributions A, B and C for programmed memory cells are also depicted. In one embodiment, the threshold voltages in the distribution E are negative and the threshold voltages in distributions A, B and C are positive. Each distinct threshold voltage distribution of FIG. 5B corresponds to predetermined values for the set of data bits. In one embodiment, each bit of data of the two bits of data stored in a memory cell are in different logical pages, referred to as a lower page (LP) and an upper page (UP). In other embodiments, all bits of data stored in a memory cell are in a common logical page. The specific relationship between the data programmed into the memory cell and the threshold voltage levels of the cell depends upon the data encoding scheme adopted for the cells. Table 1 provides an example encoding scheme.

TABLE 1

|    | E | A | B | C |
|----|---|---|---|---|
| LP | 1 | 0 | 0 | 1 |
| UP | 1 | 1 | 0 | 0 |

In one embodiment, known as full sequence programming, memory cells can be programmed from the erased data state E directly to any of the programmed data states A, B or C using the process of FIG. 6 (discussed below). For example, a population of memory cells to be programmed may first be erased so that all memory cells in the population are in erased data state E. Then, a programming process is used to program memory cells directly into data states A, B, and/or C. For example, while some memory cells are being programmed from data state E to data state A, other memory cells are being programmed from data state E to data state B and/or from data state E to data state C. The arrows of FIG. 5B represent the full sequence programming. In some embodiments, data states A-C can overlap, with memory controller 120 (or control die 211) relying on error correction to identify the correct data being stored.

FIG. 5C depicts example threshold voltage distributions for memory cells where each memory cell stores three bits of data per memory cells (which is another example of MLC data). FIG. 5C shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. Table 2 provides an example of an encoding scheme for embodiments in which each bit of data of the three bits of data stored in a memory cell are in different logical pages, referred to as a lower page (LP), middle page (MP) and an upper page (UP).

TABLE 2

|    | Er | A | B | C | D | E | F | G |
|----|----|----|----|----|----|----|----|----|
| UP | 1 | 1 | 1 | 0 | 0 | 0 | 0 | 1 |
| MP | 1 | 1 | 0 | 0 | 1 | 1 | 0 | 0 |
| LP | 1 | 0 | 0 | 0 | 0 | 1 | 1 | 1 |

FIG. 5C shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in.

FIG. 5C also shows seven verify reference voltages, VvA, VvB, VvC, VvD, VvE, VvF, and VvG. In some embodiments, when programming memory cells to data state A, the system will test whether those memory cells have a threshold voltage greater than or equal to VvA. When programming memory cells to data state B, the system will test whether the memory cells have threshold voltages greater than or equal to VvB. When programming memory cells to data state C, the system will determine whether memory cells have their threshold voltage greater than or equal to VvC. When programming memory cells to data state D, the system will test whether those memory cells have a threshold voltage greater than or equal to VvD. When programming memory cells to data state E, the system will test whether those memory cells have a threshold voltage greater than or equal to VvE. When programming memory cells to data state F, the system will test whether those memory cells have a threshold voltage greater than or equal to VvF. When programming memory cells to data state G, the system will test whether those memory cells have a threshold voltage greater than or equal to VvG. FIG. 5C also shows Vev, which is a voltage level to test whether a memory cell has been properly erased.

In an embodiment that utilizes full sequence programming, memory cells can be programmed from the erased data state Er directly to any of the programmed data states A-G using the process of FIG. 6 (discussed below). For example, a population of memory cells to be programmed may first be erased so that all memory cells in the population are in erased data state Er. Then, a programming process is used to program memory cells directly into data states A, B, C, D, E, F, and/or G. For example, while some memory cells are being programmed from data state ER to data state A, other memory cells are being programmed from data state ER to data state B and/or from data state ER to data state C, and so on. The arrows of FIG. 5C represent the full sequence programming. In some embodiments, data states A-G can overlap, with control die 211 and/or memory controller 120 relying on error correction to identify the correct data being stored. Note that in some embodiments, rather than using full sequence programming, the system can use multi-pass programming processes known in the art.

In general, during verify operations and read operations, the selected word line is connected to a voltage (one example of a reference signal), a level of which is specified for each read operation (e.g., see read compare levels VrA, VrB, VrC, VrD, VrE, VrF, and VrG, of FIG. 5C) or verify operation (e.g. see verify target levels VvA, VvB, VvC, VvD, VvE, VvF, and VvG of FIG. 5C) in order to determine whether a threshold voltage of the concerned memory cell has reached such level. After applying the word line voltage, the conduction current of the memory cell is measured to determine whether the memory cell turned on (conducted current) in response to the voltage applied to the word line. If the conduction current is measured to be greater than a certain value, then it is assumed that the memory cell turned on and the voltage applied to the word line is greater than the threshold voltage of the memory cell. If the conduction current is not measured to be greater than the certain value, then it is assumed that the memory cell did not turn on and the voltage applied to the word line is not greater than the threshold voltage of the memory cell. During a read or verify process, the unselected memory cells are provided with one or more read pass voltages (also referred to as bypass voltages) at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for verifying/reading. Other read and verify techniques known in the art can also be used.

Figure 5E:
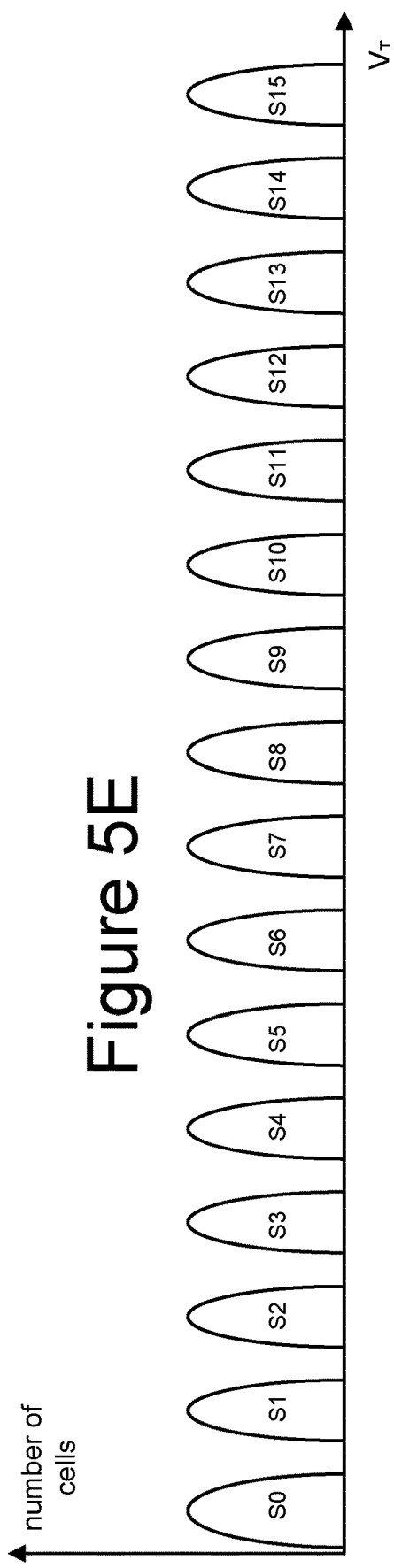

FIG. 5D depicts threshold voltage distributions when each memory cell stores four bits of data, which is another example of MLC data. FIG. 5D depicts that there may be some overlap between the threshold voltage distributions (data states) S0-S15. The overlap may occur due to factors such as memory cells losing charge (and hence dropping in threshold voltage). Program disturb can unintentionally increase the threshold voltage of a memory cell. Likewise, read disturb can unintentionally increase the threshold voltage of a memory cell. Over time, the locations of the threshold voltage distributions may change. Such changes can increase the bit error rate, thereby increasing decoding time or even making decoding impossible. Changing the read reference voltages can help to mitigate such effects. Using ECC during the read process can fix errors and ambiguities. Note that in some embodiments, the threshold voltage distributions for a population of memory cells storing four bits of data per memory cell do not overlap and are separated from each other; for example, as depicted in FIG. 5E. The threshold voltage distributions of FIG. 5D will include read reference voltages and verify reference voltages, as discussed above.

When using four bits per memory cell, the memory can be programmed using the full sequence programming discussed above, or multi-pass programming processes known in the art. Each threshold voltage distribution (data state) of FIG. 5D corresponds to predetermined values for the set of data bits. The specific relationship between the data programmed into the memory cell and the threshold voltage levels of the cell depends upon the data encoding scheme adopted for the cells. Table 3 provides an example of an encoding scheme for embodiments in which each bit of data of the four bits of data stored in a memory cell are in different logical pages, referred to as a lower page (LP), middle page (MP), an upper page (UP) and top page (TP).

TABLE 3

|    | S0 | S1 | S2 | S3 | S4 | S5 | S6 | S7 | S8 | S9 | S10 | S11 | S12 | S13 | S14 | S15 |
|----|----|----|----|----|----|----|----|----|----|----|----|----|----|----|----|----|
| TP | 1 | 1 | 1 | 1 | 1 | 0 | 0 | 0 | 0 | 0 | 1 | 1 | 0 | 0 | 0 | 1 |
| UP | 1 | 1 | 0 | 0 | 0 | 0 | 0 | 0 | 1 | 1 | 1 | 1 | 1 | 1 | 0 | 0 |
| MP | 1 | 1 | 1 | 0 | 0 | 0 | 0 | 1 | 1 | 0 | 0 | 0 | 0 | 1 | 1 | 1 |
| LP | 1 | 0 | 0 | 0 | 1 | 1 | 0 | 0 | 0 | 0 | 0 | 1 | 1 | 1 | 1 | 1 |

Figure 5F:
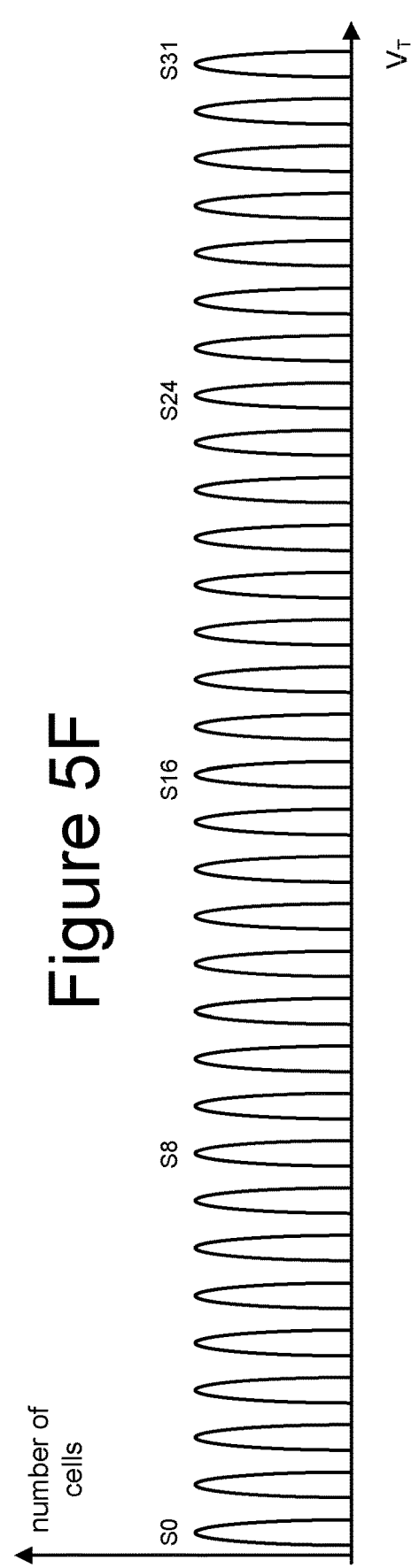

FIG. 5F depicts threshold voltage distributions when each memory cell stores five bits of data, which is another example of MLC data. In one example implementation, when memory cells store five bits of data, the data is stored in any of thirty two data state (e.g., S0-S31).

Figure 6:
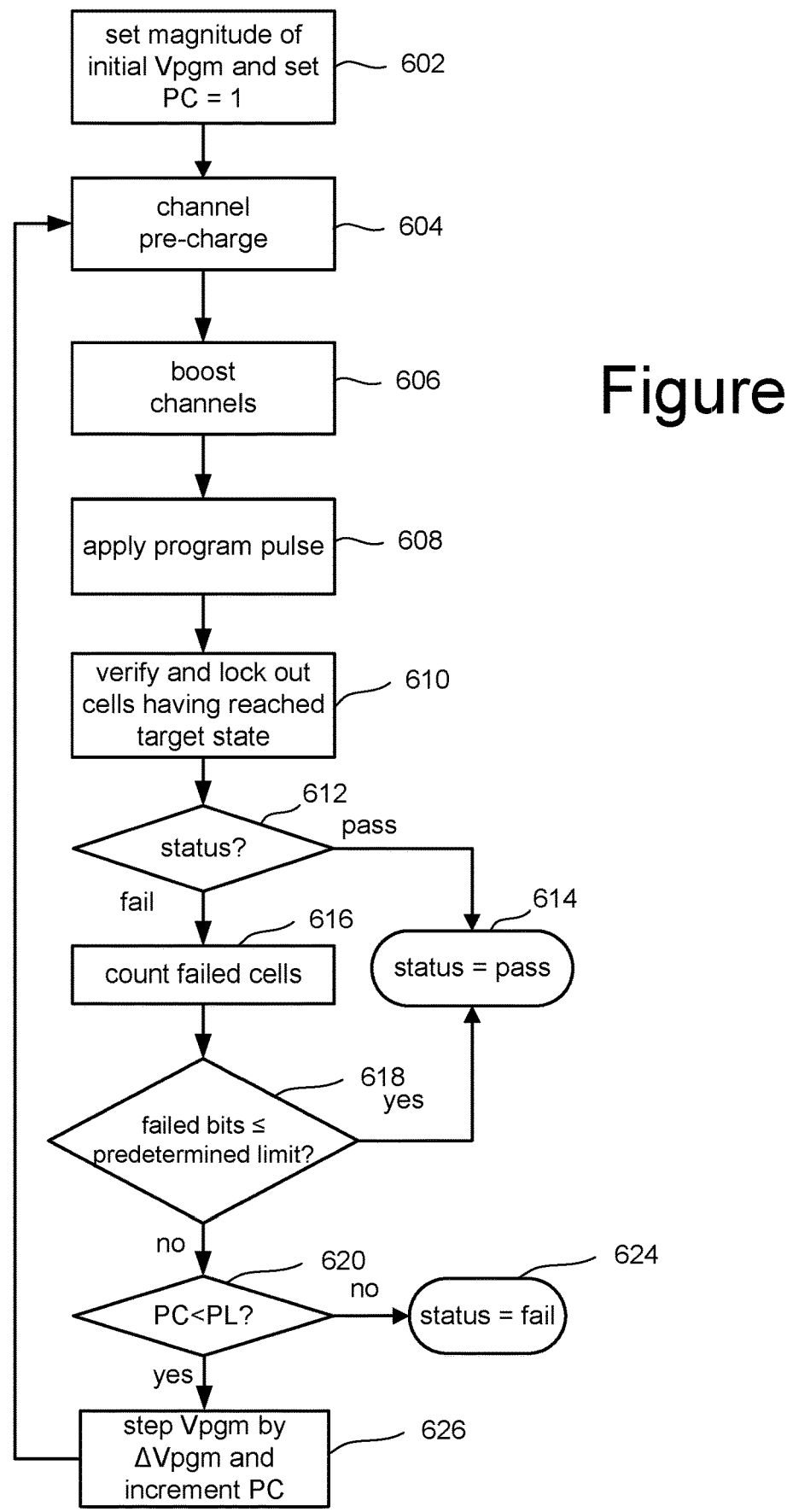
FIG. 6 is a flow chart describing one embodiment of a process for programming non-volatile memory.

FIG. 6 is a flowchart describing one embodiment of a process for programming memory cells. For purposes of this document, the term program and programming are synonymous with write and writing. In one example embodiment, the process of FIG. 6 is performed for memory array 202 using the one or more control circuits (e.g., system control logic 260, column control circuitry 210, row control circuitry 220) discussed above. In one example embodiment, the process of FIG. 6 is performed by integrated memory assembly 207 using the one or more control circuits (e.g., system control logic 260, column control circuitry 210, row control circuitry 220) of control die 211 to program memory cells on memory die 201. The process includes multiple loops, each of which includes a program phase and a verify phase. The process of FIG. 6 is performed to implement the full sequence programming, as well as other programming schemes including multi-pass programming. When implementing multi-pass programming, the process of FIG. 6 is used to implement any/each pass of the multi-pass programming process.

Typically, the program voltage applied to the control gates (via a selected data word line) during a program operation is applied as a series of program pulses (e.g., voltage pulses). Between programming pulses are a set of verify pulses (e.g., voltage pulses) to perform verification. In many implementations, the magnitude of the program pulses is increased with each successive pulse by a predetermined step size. In step 602 of FIG. 6, the programming voltage signal (Vpgm) is initialized to the starting magnitude (e.g., ~12-16V or another suitable level) and a program counter PC maintained by state machine 262 is initialized at 1. In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, in step 604 the control die will pre-charge channels of NAND strings that include memory cells connected to the selected word line that are to be inhibited from programming. In step 606, NAND strings that include memory cells connected to the selected word line that are to be inhibited from programming have their channels boosted to inhibit programming. Such NAND strings are referred to herein as "unselected NAND strings." In one embodiment, the unselected word lines receive one or more boosting voltages (e.g., ~7-11 volts), also referred to as pass voltages, to perform boosting schemes. A program inhibit voltage is applied to the bit lines coupled with the unselected NAND string.

In step 608, a program voltage pulse of the programming voltage signal Vpgm is applied to the selected word line (the word line selected for programming). If a memory cell on a NAND string should be programmed, then the corresponding bit line is biased at a program enable voltage. In step 608, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming.

In step 610, program verify is performed and memory cells that have reached their target states are locked out from further programming by the control die. Step 610 includes performing verification of programming by sensing at one or more verify reference levels. In one embodiment, the verification process is performed by testing whether the threshold voltages of the memory cells selected for programming have reached the appropriate verify reference voltage. In step 610, a memory cell may be locked out after the memory cell has been verified (by a test of the Vt) that the memory cell has reached its target state.

If, in step 612, it is determined that all of the memory cells have reached their target threshold voltages (pass), the programming process is complete and successful because all selected memory cells were programmed and verified to their target states. A status of "PASS" is reported in step 614. Otherwise, if, in step 612, it is determined that not all of the memory cells have reached their target threshold voltages (fail), then the programming process continues to step 616.

In step 616, the number of memory cells that have not yet reached their respective target threshold voltage distribution are counted. That is, the number of memory cells that have, so far, failed to reach their target state are counted. This counting can be done by state machine 262, memory controller 120, or another circuit. In one embodiment, there is one total count, which reflects the total number of memory cells currently being programmed that have failed the last verify step. In another embodiment, separate counts are kept for each data state.

In step 618, it is determined whether the count from step 616 is less than or equal to a predetermined limit. In one embodiment, the predetermined limit is the number of bits that can be corrected by error correction codes (ECC) during a read process for the page of memory cells. If the number of failed cells is less than or equal to the predetermined limit, than the programming process can stop and a status of "PASS" is reported in step 614. In this situation, enough memory cells programmed correctly such that the few remaining memory cells that have not been completely programmed can be corrected using ECC during the read process. In some embodiments, the predetermined limit used in step 618 is below the number of bits that can be corrected by error correction codes (ECC) during a read process to allow for future/additional errors. When programming less than all of the memory cells for a page, or comparing a count for only one data state (or less than all states), than the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If the number of failed memory cells is not less than the predetermined limit, than the programming process continues at step 620 and the program counter PC is checked against the program limit value (PL). Examples of program limit values include 6, 12, 16, 19, 20 and 30; however, other values can be used. If the program counter PC is not less than the program limit value PL, then the programming process is considered to have failed and a status of FAIL is reported in step 624. If the program counter PC is less than the program limit value PL, then the process continues at step 626 during which time the program counter PC is incremented by 1 and the programming voltage signal Vpgm is stepped up to the next magnitude. For example, the next pulse will have a magnitude greater than the previous pulse by a step size $\Delta$Vpgm (e.g., a step size of 0.1-1.0 volts). After step 626, the process loops back to step 604 and another program pulse is applied to the selected word line (by the control die) so that another iteration (steps 604-626) of the programming process of FIG. 6 is performed.

In one embodiment memory cells are erased prior to programming, and erasing is the process of changing the threshold voltage of one or more memory cells from a programmed data state to an erased data state. For example, changing the threshold voltage of one or more memory cells from state P to state E of FIG. 5A, from states A/B/C to state E of FIG. 5B, from states A-G to state Er of FIG. 5C or from states S1-S15 to state S0 of FIG. 5D.

One technique to erase memory cells in some memory devices is to bias a p-well (or other types of) substrate to a high voltage to charge up a NAND channel. An erase enable voltage (e.g., a low voltage) is applied to control gates of memory cells while the NAND channel is at a high voltage to erase the non-volatile storage elements (memory cells). Herein, this is referred to as p-well erase.

Another approach to erasing memory cells is to generate gate induced drain leakage (GIDL) current to charge up the NAND string channel. An erase enable voltage is applied to control gates of the memory cells, while maintaining the NAND string channel potential to erase the memory cells. Herein, this is referred to as GIDL erase. Both p-well erase and GIDL erase may be used to lower the threshold voltage (Vt) of memory cells.

In one embodiment, the GIDL current is generated by causing a drain-to-gate voltage at a select transistor (e.g., SGD and/or SGS). A transistor drain-to-gate voltage that generates a GIDL current is referred to herein as a GIDL voltage. The GIDL current may result when the select transistor drain voltage is significantly higher than the select transistor control gate voltage. GIDL current is a result of carrier generation, i.e., electron-hole pair generation due to band-to-band tunneling and/or trap-assisted generation. In one embodiment, GIDL current may result in one type of carriers, e.g., holes, predominantly moving into NAND channel, thereby raising potential of the channel. The other type of carriers, e.g., electrons, are extracted from the channel, in the direction of a bit line or in the direction of a source line, by an electric field. During erase, the holes may tunnel from the channel to a charge storage region of memory cells and recombine with electrons there, to lower the threshold voltage of the memory cells.

The GIDL current may be generated at either end of the NAND string. A first GIDL voltage may be created between two terminals of a select transistor (e.g., drain side select transistor) that is connected to or near a bit line to generate a first GIDL current. A second GIDL voltage may be created between two terminals of a select transistor (e.g., source side select transistor) that is connected to or near a source line to generate a second GIDL current. Erasing based on GIDL current at only one end of the NAND string is referred to as a one-sided GIDL erase. Erasing based on GIDL current at both ends of the NAND string is referred to as a two-sided GIDL erase.

Figure 7:
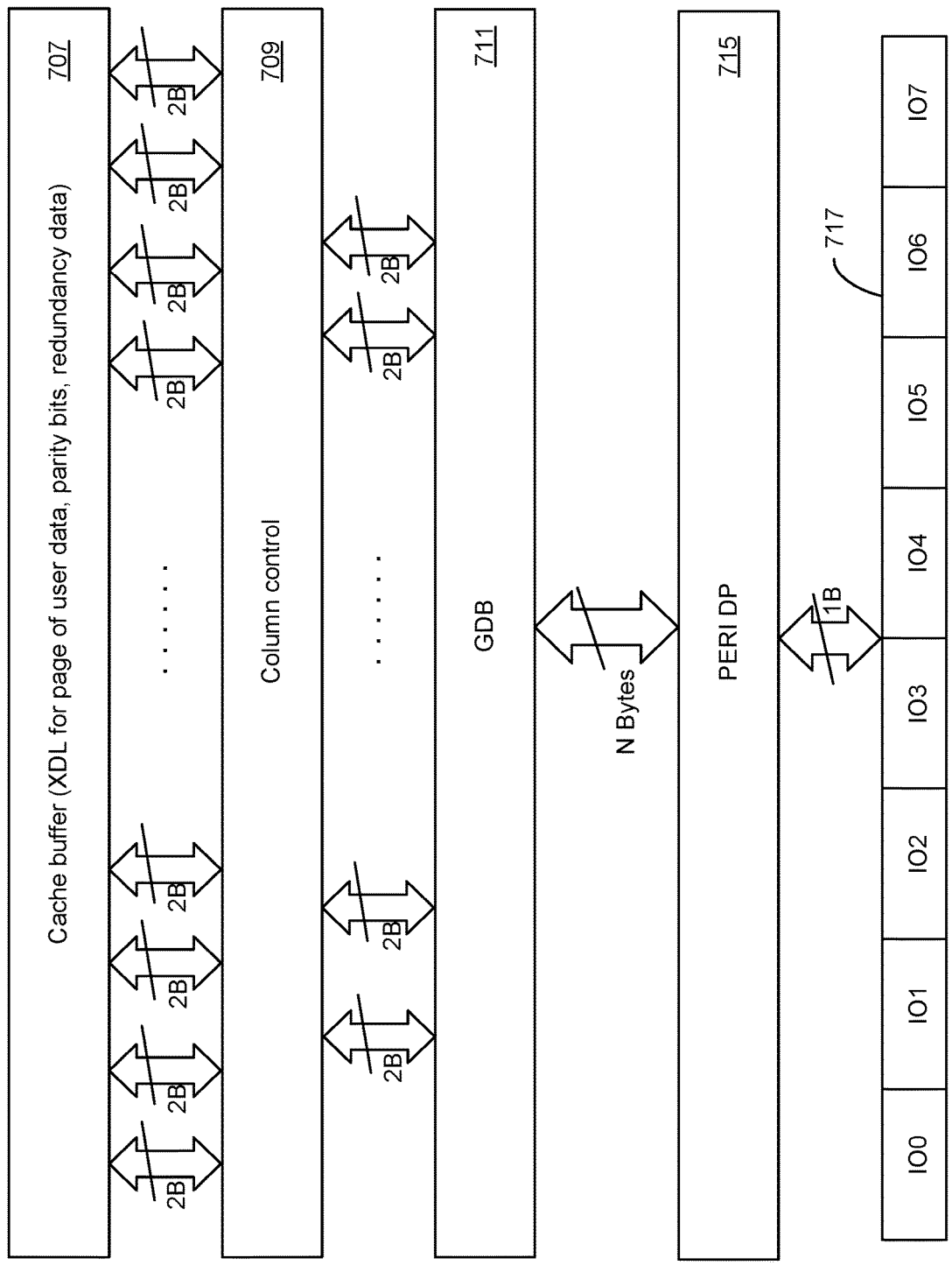
FIG. 7 is a block diagram illustrating the data paths between the IO interface and cache buffer for one embodiment.

Returning to FIG. 3, the managing circuit 302 comprises a processor 330, four example sets of data latches 340, 342, 344 and 346, and an IO interface 332 coupled between the sets of data latches and the external data bus 334, which is connected to a memory controller 120 for the transfer of data. FIG. 3 is simplified in a number of ways, including the representation of the data path between the IO interface 332 and the transfer latches XDL and other data latches 340, 342, 344, and 346. FIG. 7 illustrates this portion of the data path in more detail.

FIG. 7 is a block diagram illustrating the data paths between the IO interface and cache buffer for one embodiment. Data is written from and read into the data latches 340, 342, 344, and 346 a page at a time, where a page can have a very large number of bits to maximize write and read parallelism for high performance. The size of the external data bus 334 is much smaller, such as being a byte wide. Consequently, incoming data will need to be converted from a serial format to a parallel format, while read data will be converted from a parallel format to serial format for transferring out to the controller. Here, the serial format need not be a single bit serial format, but will generally be a multi-bit serial format, such as the byte-wide serial format in the examples presented here. The transformations between the serial and parallel formats will then be between serial bytes of data and parallel multi-bytes of format. To convert between a typical byte-wide serial format for the external data bus between the IO interface 332 and the non-volatile memory controller 120 and the very large number of bytes of the pages of data stored in the XDL transfer latches, the data will usually go through many levels serial to parallel (for the write path) or parallel to serial (for the read path), where at each transition the corresponding transfer clocks rate will need to be altered accordingly.

At top, FIG. 7 includes the cache buffer 707 and column control circuitry 709 for one of the planes. Referring back to FIGS. 2A and 2B, these elements are part of the column control circuitry 210, where the detail of FIG. 3 illustrates the transfer data latches XDL (within the sets of latches 340, 342, 344, 346) that can correspond to the cache buffer 707. Data, both user data and ECC data (i.e., parity bits and redundancy bits), is read from and written to the memory cells in pages that will include user data as well as parity bits and redundancy data for defective memory cells. The pages are selected and read by the control circuits based on a read clock speed and stored into the cache buffer 707 and transferred as 2 byte words at a first clock speed to the column control circuitry 709. The 2 byte words are similarly transferred in the other direction in the write process. Between the column control circuitry 709 and the global data bus GDB 711 the data can be transferred at a higher rate, at a double data rate for example. A memory die will, as described with respect to FIG. 4A, often have multiple planes and the global data bus GDB 711 may spans multiple or all of the planes, so that cache buffer 707 and column control circuitry 709 can correspond to any of the planes on the die. The read or write data is transferred between the global data bus GDB 711 and the peripheral data path (DP) block 715 with a width of N bytes, where N is greater than 1 and the (byte-wise) level of parallelism. In peripheral DP block 715, the data is converted to/from a (byte-wide) serial format, where it is held loaded into FIFOs to be transferred out over or read in from the pads of the interface 717 at the interface data rate. Different embodiments will have differing architectures for the number of transitions and of different degrees for the conversions between serial and parallel formats. The different degrees can depend on the width of the external data bus to which the IO pads 717 connect, the host transfer speeds on the serial end, and page size and read/write speeds on the parallel end, but FIG. 7 gives an example of the sort of transitions involved.

The transfers between IO pads 717 and the peripheral DP 715 is a byte wide serial transfer performed at a rate of the transfer clock of the host. As the degree of parallelism increases, the transfer rate decreases, so that, for example, as the width of transfers from the peripheral DP block 715 to the global data bus 715 increases by a factor of 24, the transfer speed is correspondingly decreased by a factor of 24 relative to the clock rate on the external data bus. Similarly, as the degree of parallelism between the cache buffer 707 and the column control circuitry 709 is twice that of the transfers into the column control circuitry 709 from the internal global data bus 711, the transfer rate is correspondingly dropped by half. As user transfer speeds at the IO pads 717 continue to increase, it becomes increasingly difficult to accurately perform the serial to parallel and parallel to serial conversions to allow for sufficient times for read and write operations. To meet these demands, it is important to test the circuitry both for errors and to determine safe operating speeds, and also to trim the circuitry's operating parameters.

One way to test the circuitry is by use of external test circuitry connected to the IO pads 717. It can be difficult and time consuming (and, consequently, expensive) to use an external tester to individually verify the high-speed data paths of memory dies one by one. For example, attaching each of a memory die's IO pads to the probe contacts of the external tester 499 can itself be a source of error, even if the memory die itself is not defective. Once the memory dies are assembled into a multi-chip package, testing at the package level can be done more easily, and more quickly as the number of tests is reduced. But as the presence of a single bad memory die will result in the whole of the package being discarded, waiting to test until individual circuits are assembled into packages severely affects yields. Both the inclusion of more dies in each package and the operation of these dies at higher speeds exacerbate this yield problem. To remedy the shortcomings of external testers, built-in self-test circuitry is introduced on the integrated circuit for high-speed IO data path testing, such as illustrated with respect to FIG. 8.

Figure 8:
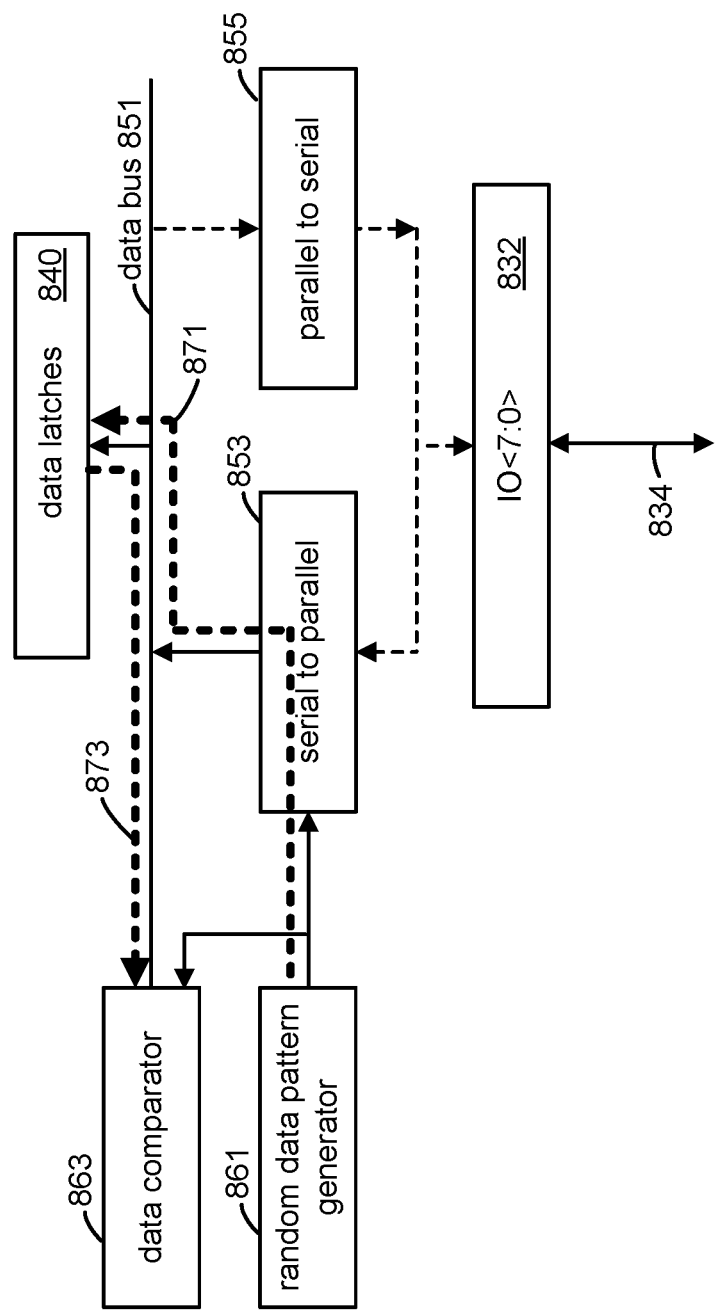
FIG. 8 is a block diagram illustrating an embodiment for incorporating built-in self-test (BIST) circuitry for the IO pads to cache buffer data path into control circuitry of FIG. 2A or 2B.

FIG. 8 is a block diagram illustrating an embodiment for incorporating built-in self-test (BIST) circuitry for the IO pads to cache buffer data path into control circuitry of FIG. 2A or 2B. Relative to FIG. 7, the data path diagram is simplified. In FIG. 8, the data latches 840 are connected to the internal data bus 851, which is in turn connected to the IO pads IO<7:0> 832 through a write path including the serial to parallel circuitry 853 and a read path including the parallel to serial circuitry 855. In a data write, data would be received over external bus 834 in a byte wide serial format, transferred through the stages of the serial to parallel circuitry 853 onto the internal data bus 851 and then loaded into the data latches 840. In a data read, the data is transferred from the data latches 840 on to the internal data bus 851, through the stages of the parallel to serial circuitry 855 to the IO pads IO<7:0> 832, from where the data is transferred to the external data bus 834. In the example embodiment, the path to be tested is through the serial to parallel circuitry 853 into the transfer data latches of 840 and then back out onto the internal data bus 851, although for the write data path to be tested.

To test the write data path, the test circuitry of random data pattern generator 861 and data comparator 863 are added to the control circuitry in this example. The random data pattern generator 861 provides a data set to the serial to parallel circuitry 863, which is then transferred through the serial to parallel circuitry 863, onto the data bus 851, and then stored in the data latches 840, as illustrated by the data path of the heavy broken line 871. Once stored in the data latches 840, the data pattern as stored is then read out onto the internal data bus 851 and transferred to the data comparator 863, as illustrated by the data path of the heavy broken line 873. The random data pattern generator 861 also transfers the transmitted data pattern to the data comparator 863, so that the original data pattern can be compared to the data pattern after transversing the paths 871 and 873 to determine the amount of error. In FIG. 8, the paths to and from the IO pads IO<7:0> 832 and the path from internal data bus 851 to parallel to serial circuitry is represented in a lighter weight broken line to indicate that it is not part of the test path. In addition to checking for defects, this process can be used to determine an upper limit to safe operating speeds and for trimming parameters related to aligning the different clocks speeds of the serial-parallel transitions.

To test that the data path circuitry can handle data received on the external data bus at the user clock speed (i.e., the speed used on the external data bus, such as set by the controller), it is tested at least at this speed and higher speeds to ensure data can be reliable be transferred on the data path. As user data transfer speeds continue to increase, this means that a user data clock impersonator of the built-in self-test needs to run at correspondingly higher speeds for the internal data loopback path testing and for stressing the path for defect testing. However these higher clock speeds can make it difficult to accurately trim parameters for the data path, such as correlating the different transfer clocks used between stages of differing levels of parallelism in the circuit of FIG. 7. The higher speed clock can also make it unsuitable for internal data transfers, such as during booting up or a prefetch operation (i.e., to set starting column address, readout data from XDL, and move the XDL data to fill the data pipeline for data out), that do not need to rely on the external user clock.

To address these concerns, the following presents built-in self-test techniques and circuitry that allow the decoupling of the user clock impersonator for use in the internal data loopback path and stress mode testing from the clock used for trimming modes or internal data transfers. The clock speeds for high speed data path testing and trimming can then be optimized for these processes and decoupled from the clock used for booting-up control circuitry and prefetching data from XDL. This allows for the modes that need to emulate user clock speeds to use the higher clock rates for testing without affecting a clock rate used in, for example, a prefetch operation. The differing modes that require the stress modes can be multiplexed from a faster clock that is used in the higher speed test modes. This allows for use of a higher clock speed for data path test modes to determine maximum speeds, while operations such as booting-up control circuitry and prefetching data need not have their clock speeds change as transfer speeds increase for different generations of devices. As user clock speed of future devices continue to increase, clock speeds for high speed testing and trim modes will need to also increase in each generations, but by decoupling the clock used for internal data transfers (YOSC in the below discussion), this does not need to change frequencies for future generations.

Figure 9A:
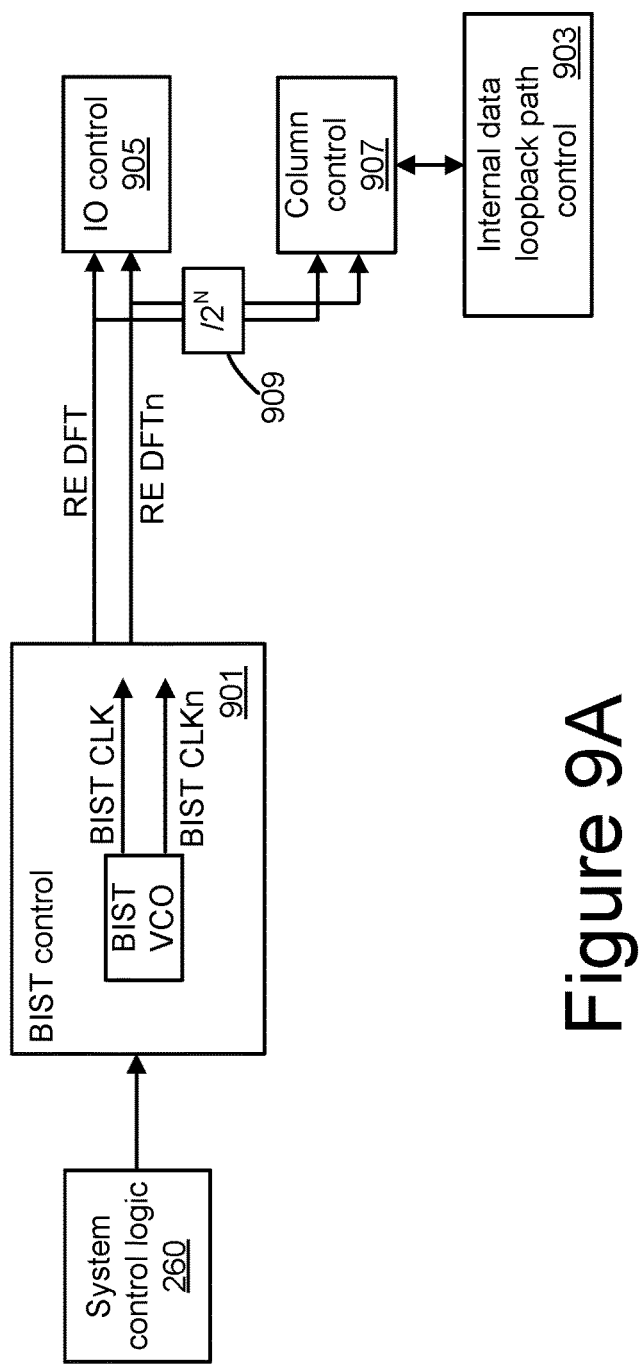
FIGS. 9A and 9B are block diagrams of some of the control circuitry for built-in self-test operations with the decoupling of the user clock impersonator for use in the internal data loopback path and stress mode testing from the clock used for trimming modes.
Figure 9B:
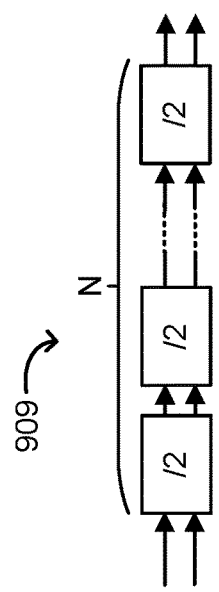

FIGS. 9A and 9B are block diagrams of some of the control circuitry for built-in self-test operations with the decoupling of the user clock impersonator for use in the internal data loopback path and stress mode testing from the clock used for internal data transfer modes. FIG. 9A illustrates some of the circuitry and signals of the BIST control circuitry. The elements of FIG. 9A are part of the control circuitry of memory die of FIG. 2A and control die 2B, with some of the elements and some of the signals relevant to the discussion here explicitly shown and where the other elements of the control circuitry are included in the system control logic block 260 of FIG. 9A.

BIST control circuitry and BIST VCO block 901 controls BIST operations and provides corresponding clock signals BIST CLK and its inverse BIST CLKn, such as generated by a multi-stage (e.g., 3-stage) inverter based ring voltage controlled oscillator (VCO), based on signals received from system control logic. From the BIST CLK/BIST CLKn signals used for the test process illustrated in FIG. 8, the BIST control circuitry 901 generates a high speed read enable clock and its inverse RE DFT/RE DFTn to the IO control circuitry 905 for testing of the transfer between the IO pads 717 and the peripheral data path circuitry 715. The signals RE DFT/RE DFTn are provided to the column control circuitry 907 through a divide by 2N circuit 909. For example, N could be 5 to divide the test clock frequency by 32. The clock obtained by dividing RE DFT/RE DFTn in circuit 909 and as provided by the column control circuitry 907 is then used by the internal data loopback path control 903 for the test process illustrated in FIG. 8, where the data comparator 863 and random data pattern generator 861 can be considered part of the internal data loopback path control 903. For proper testing, the internal data loopback path control 903 needs to be able provide the signals RE DFT/RE DFTn of a higher speed than specified for the user read clock used on the external data bus.

An embodiment of the divide circuit 909 is illustrated by FIG. 9B. In this arrangement, the divide by $2^N$ circuit for the clock is implemented as a series on N device by 2 stages. In terms of physical placement on a die, in an actual layout, the column control circuitry 907 may be located relatively far from the clock division circuitry 909. As higher frequency signals tend to suffer from higher levels of degradation than lower frequency signals due to capacitive losses and other factors, the division circuit 909 is preferably located nearer the column control circuitry 907. The column control circuitry 907 can have another clock divider inside to recover clock duty degradation and provide the divided clock to the internal data loopback path control 903.

To be able to decouple the high speed clock used for high speed testing modes of the data input/output circuits from the modes used for internal data transfers, the techniques presented here introduce a two (or, more generally, multiple) stage clock reduction circuit so that differing amounts of speed reduction of the high speed BIST clock signal can be selected depending on the process being performed. This can be illustrated with respect to FIGS. 10A and 10B.

Figure 10A:
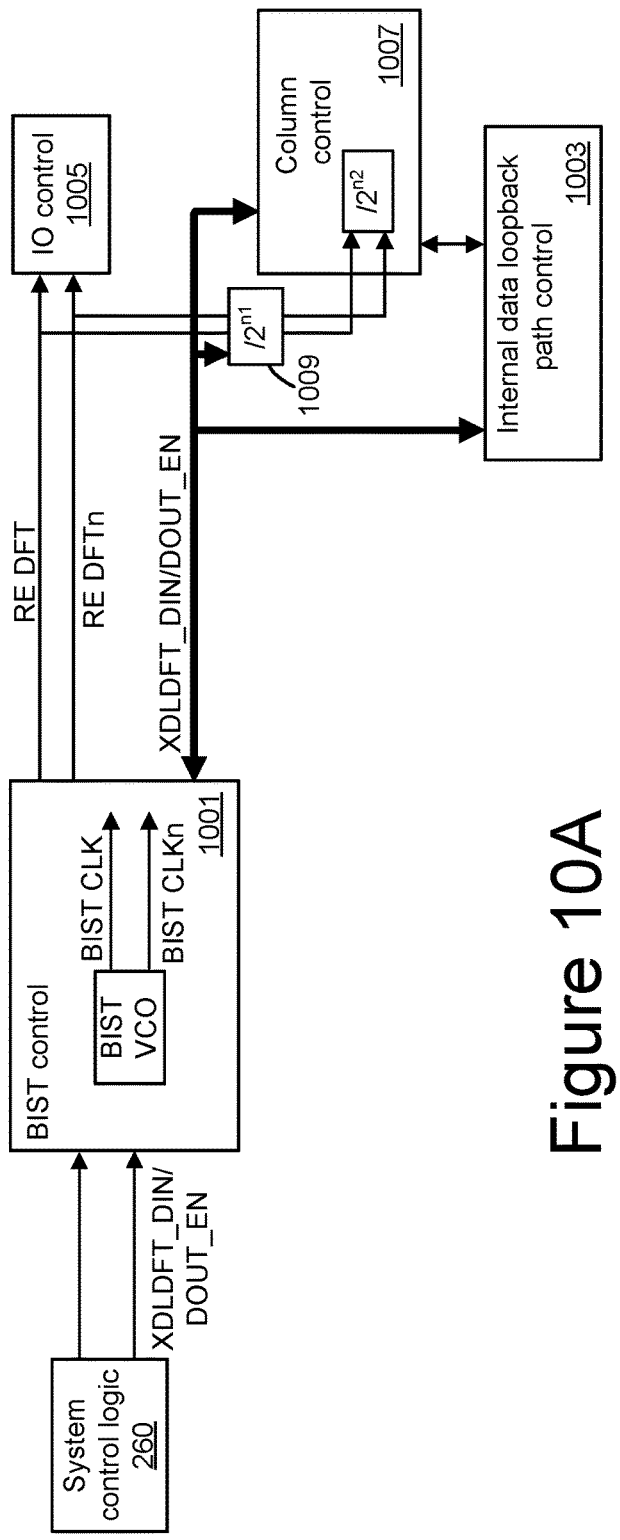
FIGS. 10A and 10B illustrate an embodiment for built-in self-test circuitry that can selectively provide a higher speed clock signal for data path testing and stress and lower speed clock signal for a trim mode.
Figure 10B:
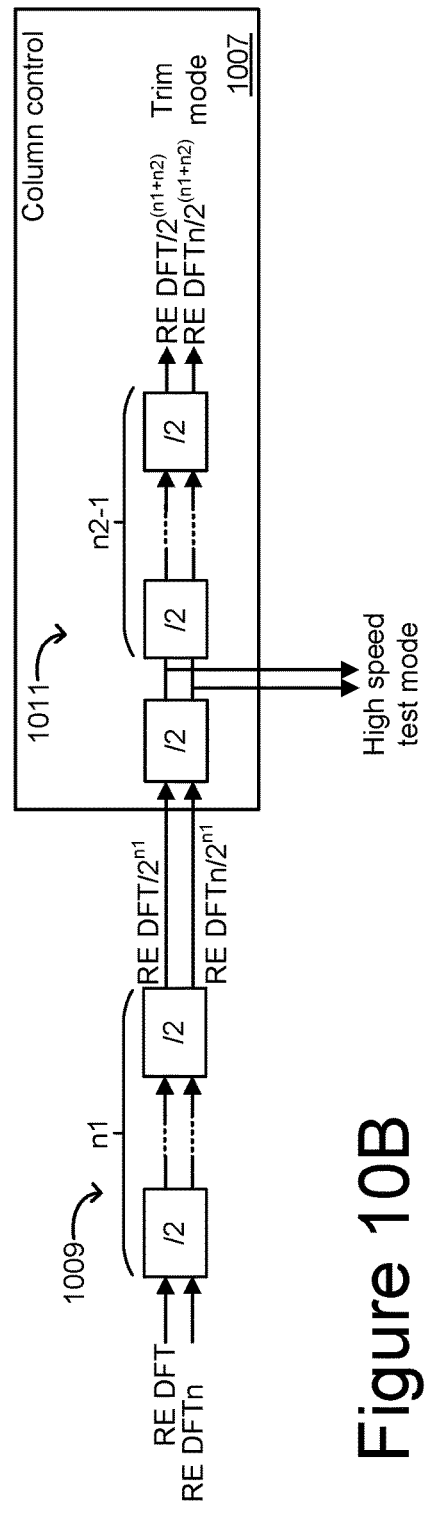

FIGS. 10A and 10B illustrate an embodiment for built-in self-test circuitry that can selectively provide a higher speed clock signal for data path testing and stress and a lower speed clock signal for a trim mode. FIG. 10A is laid out similarly to FIG. 9A, with similarly numbered blocks (i.e., BIST control and BIST VCO 901/1001) configured to perform similar functions. FIG. 10A differs from FIG. 9A in that the clock divider circuit is split into two (or, more generally, multiple) clock divider circuits, a first clock divider circuit 1009 that divides RE DFT/RE DFTn by $2^{n1}$ and additional clock divider circuitry in the column control circuitry 1007 that can selectively further divide RE DFT/RE DFTn by $2^{n2}$. To select between the modes, a control signal XDLDFT_DIN/DOUT_EN is introduced. The system control logic 260 determines which, if either, BIST mode is enabled and is provided to the BIST control and BIST VCO circuitry 1001, from which it is shared with internal data loopback control 1003, divider 1009, and column control circuitry 1007. In this way, both a high speed BIST clock from the first divider, with a lower speed clock that can also be used from trim operations.

When the high speed internal data loop mode is selected for testing the serial to parallel data in path 853 or the parallel to serial data out path 855 to and from the cache buffer 707, the XDLDFT_DIN/DOUT_EN is asserted by the system control logic 260 and the divider circuit 1009 is enabled and the RE DFT/RE DFTn is divided by $2^{n1}$ and provided to the column control circuitry 1007. The RE DFT/RE DFTn signal divided by $2^{n1}$ and, in some embodiment, one or more additional powers of 2, is provided to the internal data loopback path control 1003 for the high speed test mode. (For example, in the embodiment of FIG. 10B, RE DFT/RE DFTn is further divided by 2 to provide the clock RE DFT/RE DFTn divided by $2^{(n1+1)}$. In a trim mode, the XDLDFT_DIN/DOUT_EN is not asserted and the RE DFT/RE DFTn is divided by $2^{n1}$ at divider 1009 and further divided by $2^{n2}$ by the column control circuitry 1007, so that DFT/RE DFTn is divided by $2^{(n1+n2)}$.

FIG. 10B illustrates more detail on the clock divider circuits of circuit 1009 and the divider circuits incorporated into the column control circuitry 1007. The read enable clock signals RE DFT/RE DFTn are received from the BIST control 1001, that in this embodiment has n1 divide by 2 stages, and provide the RE DFT/RE DFTn divided by $2^{n1}$ to the column control circuitry 1007. The clock signals of frequency RE DFT/$2^{n1}$ and RE DFTn/$2^{n1}$ are received at the column control circuitry 1007, which also receives the control signal XDLDFT_DIN/DOUT_EN. When XDLDFT_DIN/DOUT_EN is asserted, the clock signals for higher speed test modes, where this can be frequency RE DFT/$2^{n1}$ and RE DFTn/$2^{n1}$ or further divided by one or more powers of 2, depending of the embodiment, such as RE DFT/$2^{(n1+1)}$ and RE DFTn/$2^{(n1+1)}$ as illustrated in FIG. 10B. When XDLDFT_DIN/DOUT_EN is not asserted, the slower clock signals of frequency RE DFT/$2^{(n1+n2)}$ and RE DFTn/$2^{(n1+n2)}$ are used, such as in a trim mode. In an actual circuit layout on a die, the clock divider 1009 can be relatively far from column control circuitry 1007, so that if divider 1009 is placed near the column control circuitry 1007, this can reduce signal loss and degradation on the path to column control circuitry 1007. As divider 1009 may also be placed far from the internal data loopback path control 1003, in the embodiment here the frequency is further divided inside column control circuitry 1007 as it may be located relatively closely to the internal data loopback path control 1003. With respect to the values of n1 and n2, these can be optimized for the different test/trim modes, with n1 optimized for high speed testing of the data in path and (n1+n2) optimized for setting trim values. With respect to the embodiment of FIGS. 9A and 9B, n1 and n2 can be selected such that (n1+n2)=N, so that in the N=5 example, n1 could equal 4 and n2=3. More generally, in other embodiments $n_1+n_2 \geq N$ to provide a lager range of test clock values.

Figure 11:
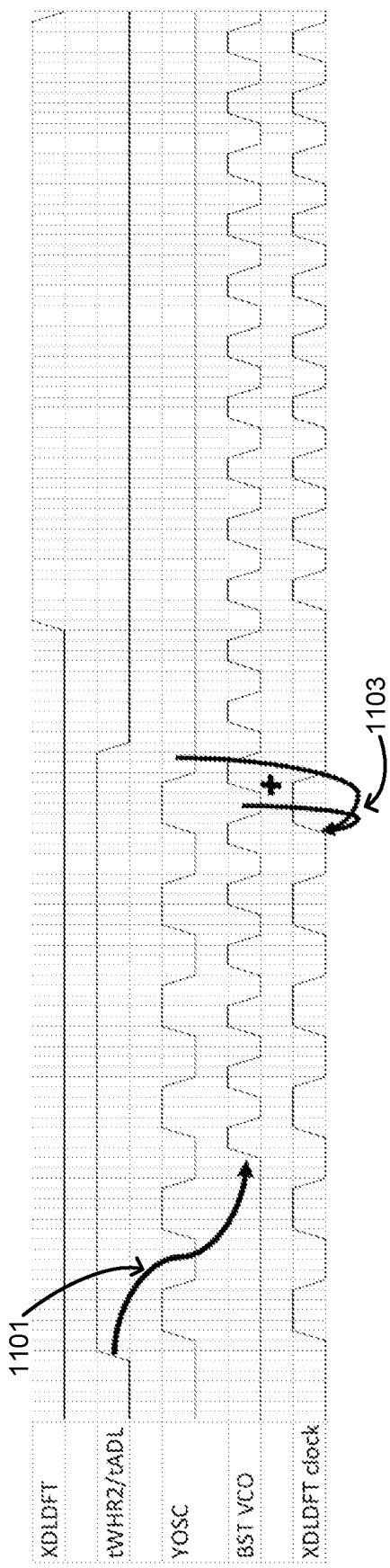
FIGS. 11 and 12 present two embodiments of high level waveforms for starting up the high speed data transfer clock.
Figure 12:
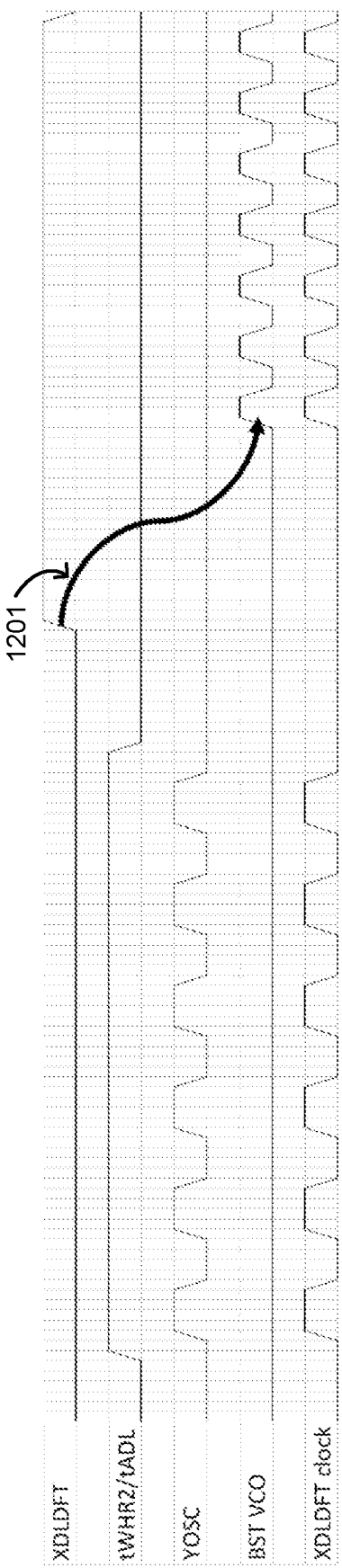

FIGS. 11 and 12 present two embodiments of high level waveforms for starting up the high speed data transfer clock. In FIGS. 11 and 12, the top waveform XDLFT is the enable signal waveform (XDLDFT_DIN/DOUT_EN in FIGS. 10A and 10B) and is high when the high speed transfer test is being performed in the latter part of the waveform. The second waveform tWHR2/tADL is high during an initial prefetch period that can be used to set starting column address, readout data from XDL, and move the XDL data to fill the data pipeline for data out. Initially, tWHR2/tADL goes high to perform the prefetch, then goes low before XDLFT is asserted. The YOSC is a column control circuitry 709 transfer clock used during the prefetch operation, after which it goes low. The data transfer clock XDLDFT clock corresponds to the YOSC clock during the prefetch period. These top three waveforms and the first part of the bottom waveform are the same for the embodiments of both of FIGS. 11 and 12.

In the embodiment of FIG. 11, the BST VCO waveform of built-in self-test VCO of block 901 starts up during the prefetch phase after tWHR2/tADL goes high, as illustrated at 1101, and continues on through the high speed test period while XDLDFT is high. The XDLFT clock during the test mode is generated by merging YOSC and BST VCO as represented at 1103 to form a new XDLDFT clock. Once tWHR2/tADL goes low, the XDLDFT clock at the same period as YOSC stops. Once XDLDFT goes high, the XDLDFT clock then runs at the BST VCO rate for the test period and corresponds to the BIST CLK of FIG. 10A. The embodiment of FIG. 11 also for the BST VCO clock to stabilize before its being used and also hides its startup time. As represented at 1103, the XDLDFT clock does need to be synchronized for clock multiplexing with logic circuitry in the BIST control and BIST VCO circuitry 1001 to avoid glitches.

In the embodiment of FIG. 12, the BST VCO is turned on by a mode select signal after tWHR2/tADL goes low and XDLDFT goes high, as illustrated at 1201. Once BST VCO starts up, XDLDFT clock follows the BST VCO for the test period. Under this arrangement, there is no need to synchronize the XDLDFT waveform when switching between the YOSC matching clock signal during prefetch and the BST VCO matching clock signal while testing. As the BST VCO starts up later, total current levels are also lowered. On the downside, startup time is increased relative to the embodiment of FIG. 11. Under the arrangement of FIG. 12 as used in the embodiments here, the clock impersonator (i.e., RE_DFT/2n1) used in the test modes is decoupled from the YOSC clock for internal data transfers, such as prefetch operations, and booting up.

Figure 13:
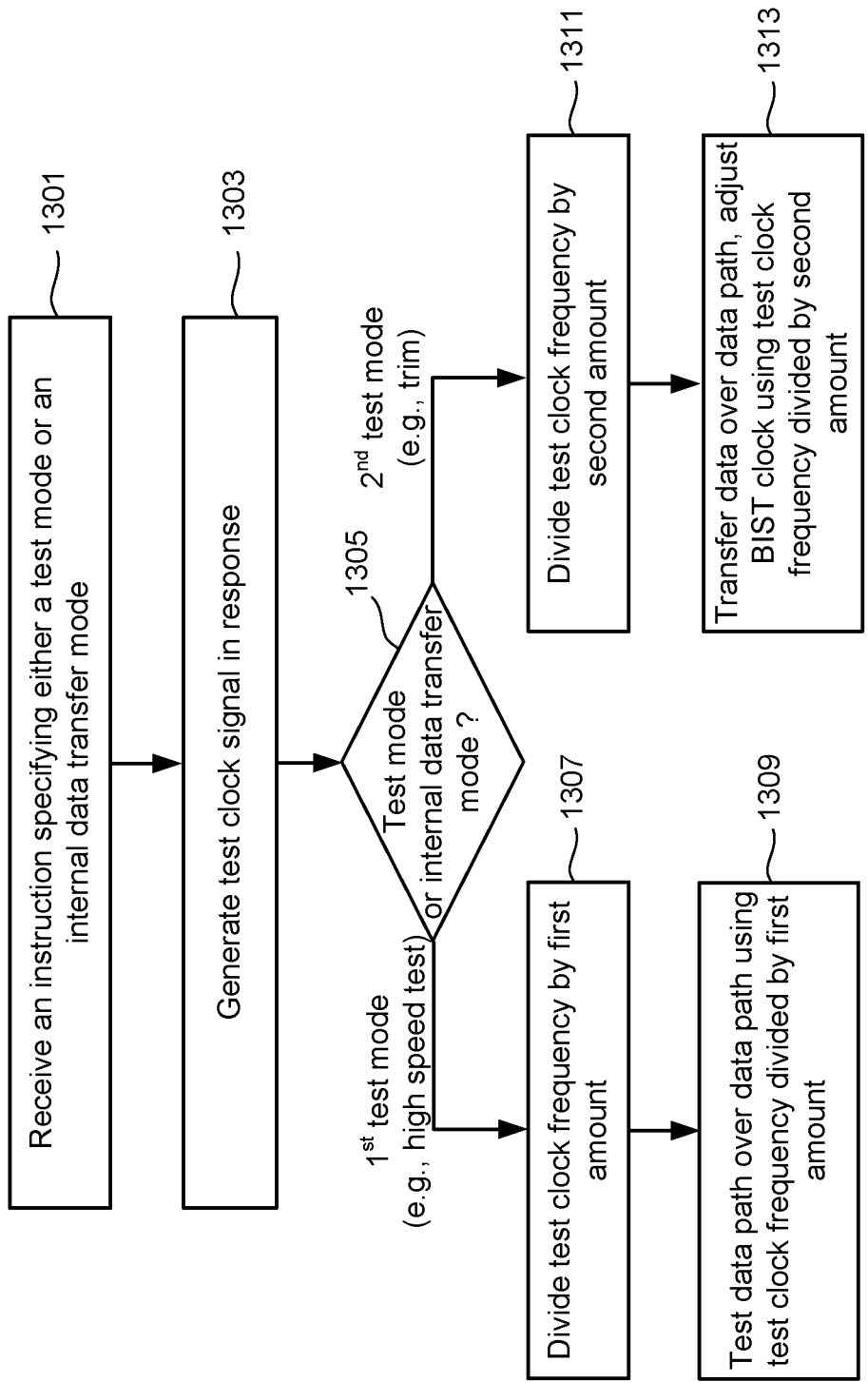
FIG. 13 is a flowchart of an embodiment for the operation of the test circuitry of FIGS. 10A-12.

FIG. 13 is a flowchart of an embodiment for the operation of the test circuitry of FIGS. 10A-12. At step 1301, the built-in self-test circuitry of the memory device's control circuitry receives an instruction specifying either to perform a test of the data path through the serial to parallel conversion of the memory device to the cache memory used to store data to be written to or read out from an array of memory cells of the memory device, where the instruction specifies either a first test mode (e.g., high speed test mode) or a second test mode (e.g., trim mode). Referring to the embodiment of FIG. 10A, the built-in self-test circuitry is part of the larger set of control circuitry and can include elements including BIST control and BIST VCO circuitry 1001, the internal data loopback path control 1003, the IO control 1005, clock division circuitry 1009, and column control 1007. The control circuitry can include the other elements of system control logic 260 which provides the XDLDFT_DIN/DOUT_EN to the including BIST control and BIST VCO circuitry 1001 that, depending on whether or not it is asserted, will specify the test mode.

In response to the instruction to perform the test of the data path, in step 1303 the VCO of the BIST control and BIST VCO logic can generate the test clock signals BIST CLK/BIST CLKn that are provided to the internal data loopback path control 1003. Step 1305 determines whether the first or second test mode is selected. If the test instruction specifies a first test mode (i.e., whether or not XDLDFT_DIN/DOUT_EN is asserted), such as a high speed data path test, the test clock signals have their frequency divided by a first amount in step 1307. For example, in FIGS. 10A and 10B, the signal pair RE DFT/RE DFTn is divided in divided 1009 by $2^{n1}$ in this example. FIGS. 11 and 12 illustrate two embodiments for starting this high speed test clock signal in the latter part of the XDLDFT clock waveform. At step 1309 the data path is then tested as illustrated, for example, in the embodiment of FIG. 8 by transferring a data pattern from generator 861 over the serial to parallel data in path 871 (where an embodiment for serial to parallel block 853 is shown in more detail with respect to FIG. 7) to the data latches 840, read back out along path 873 and compared to the original pattern in data comparator 863.

If the test instruction specifies the second test mode, such as a trim operation, the test clock signals have their frequency divided by a second amount in step 1311. For example, in FIGS. 10A and 10B, the signal pair RE DFT/RE DFTn is divided in divided 1009 by $2^{n1}$ and then further divided by $2^{n2}$ in the column control circuit 1007, in this example. The data path is then tested in step 1313, such as checking the BIST clock frequency to obtain trim values.

The discussion above has been presented in the context of a specific exemplary embodiment, namely testing a data input path of a NAND memory device. As the techniques involved do not depend upon the specifics of memory cell technology, the circuitry and methods can be similarly applied to memory devices using different memory cell technologies, such as MRAM or phase change memory. Additionally, the preceding discussion has focused on testing the data in path through the serial to parallel conversion to the cache buffer used to store pages of data to be written in the memory array. The techniques can be similarly applied to the parallel to serial data out path from the cache buffer s or other portions of the control circuitry transferring data.

According to a first set of aspects, a non-volatile memory device includes a control circuit configured to connect to an array of non-volatile memory cells. The control circuit comprises: a plurality of input/output pads configured to receive and transmit data in a multi-bit serial format; a cache buffer configured to store data to be written in and read from the array; data path circuitry connected to transfer data between the cache buffer and the plurality of input/output pads and configured to convert received data from the serial format to a parallel format when transferring the received data from the input/output pads to the cache buffer and to convert read data from the parallel format to the serial format when transferring the read data from the cache buffer to the input/output pads; and a voltage controlled oscillator. The control circuit is configured to: generate by the voltage controlled oscillator a clock signal with a first frequency; select either a first test mode or a second test mode for the data path circuit; in response to selecting the first test mode, divide the first frequency by a first amount and test the data path circuitry using a clock with a frequency of the first frequency divided by the first amount; and in response to selecting the second test mode, divide the first frequency by a second amount and test the data path circuitry using a clock with a frequency of the first frequency divided by the second amount.

In further aspects, a method includes: receiving, at a built-in self-test circuit of a non-volatile memory device, an instruction to test a data path of the non-volatile memory device specifying either a first test mode or a second test mode, the data path being between input pads of the non-volatile memory device and a cache buffer configured to store data to be written to memory cells of the non-volatile memory device, the data path configured to convert data received at the input pads in a serial format to a parallel format for storing in the cache buffer; and in response to the instruction to test the data path, generating a test clock signal. In response to the instruction to test the data path specifying the first test mode, the method includes: dividing a frequency of the test clock signal by a first amount; and testing the data path using test clock signal divided by the first amount. In response to the instruction to test the data path specifying the second test mode, the method also includes: dividing the frequency of the test clock signal by a second amount; and testing the data path using test clock signal divided by the second amount.

Additional aspects include a non-volatile memory device, comprising: an array of non-volatile memory cells; a plurality of input/output pads; a cache buffer configured to store data to be written in the array; a data path circuit configured to transfer data from the plurality of input/output pads to the cache buffer, including converting the transferred data from a serial format to a parallel format; and one or more control circuits. The one or more control circuits include a built-in self-test, including a voltage controller oscillator, connected to the data path circuit, and configured to: receive a command to perform a test on the data path circuit specifying either a first test mode or a second test mode; in response to receiving the command to perform the test, generate a test clock signal by the voltage controlled oscillator; in response to the command to perform the test specifying the first test mode, divide a frequency of the test clock signal by a first amount and test the data path circuit in the first mode using the frequency of the test clock signal divided by the first amount; and in response to the command to perform the test specifying the second test mode, divide the frequency of the test clock signal by a second amount and test the data path circuit in the second mode using the frequency of the test clock signal divided by the second amount.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory device, comprising:
   a control circuit configured to connect to an array of non-volatile memory cells, the control circuit comprising:
      a plurality of input/output pads configured to receive and transmit data in a multi-bit serial format;
      a cache buffer configured to store data to be written in and read from the array;
      data path circuitry connected to transfer data between the cache buffer and the plurality of input/output pads and configured to convert received data from the serial format to a parallel format when transferring the received data from the input/output pads to the cache buffer and to convert read data from the parallel format to the serial format when transferring the read data from the cache buffer to the input/output pads; and
      a voltage controlled oscillator,
   the control circuit configured to:
      generate by the voltage controlled oscillator a clock signal with a first frequency;
      select either a first test mode or a second test mode for the data path circuit;
      in response to selecting the first test mode, divide the first frequency by a first amount and test the data path circuitry using a clock with a frequency of the first frequency divided by the first amount; and
      in response to selecting the second test mode, divide the first frequency by a second amount and test the data path circuitry using a clock with a frequency of the first frequency divided by the second amount.

2. The non-volatile memory device of claim 1, wherein the control circuit is formed on a control die, the non-volatile memory device further comprising:
a memory die including the array of non-volatile memory cells, the memory die separate from and bonded to the control die.

3. The non-volatile memory device of claim 1, wherein, in the first test mode and in the second test mode, the control circuit is further configured to:
transfer a data pattern over the data path circuitry; and
store the transferred data pattern in the cache buffer.

4. The non-volatile memory device of claim 3, wherein, in the first test mode and in the second test mode, the control circuit is further configured to:
read out the transferred data pattern as stored in the cache buffer; and
compare the read out transferred data pattern with the data pattern as transferred.

5. The non-volatile memory device of claim 3, wherein the control circuit is further configured to:
generate data pattern as a randomly generated data pattern.

6. The non-volatile memory device of claim 1, wherein the clock used in the second test mode is a slower clock than in the first test mode, and wherein the second test mode is a mode to determine trim values for the data path circuitry.

7. The non-volatile memory device of claim 1, wherein the clock used in the first test mode is a faster clock than in the second test mode, and wherein the first test mode is a high speed mode in which the clock used in the first test mode is a faster clock than used when receiving user data at the input/output pads.

8. The non-volatile memory device of claim 1, where the multi-bit serial format is a byte-wide serial format.

9. The non-volatile memory device of claim 1, wherein the data path circuitry comprises a plurality of stages of conversion from the serial format to the parallel format when transferring the received data from the input/output pads to the cache buffer and a plurality of stages of conversion to convert read data from the parallel format to the serial format when transferring the read data from the cache buffer to the input/output pads.

10. The non-volatile memory device of claim 1, wherein the control circuit further comprises:
a first set of one or more serial connected divide by two frequency dividers; and
a second set of one or more serial connected divide by two frequency dividers, wherein the control circuit is further configured to:
in the first test mode, divide the first frequency by the first amount using the first set of divide by two frequency dividers; and
in the second test mode, divide the first frequency by the second amount using the first set of divide by two frequency dividers in series with the second set of divide by two frequency dividers.

11. The non-volatile memory device of claim 1, further comprising the array of non-volatile memory cells, wherein the array is a NAND memory array.

12. The non-volatile memory device of claim 1, further comprising the array of non-volatile memory cells, wherein the memory cells are phase change memory cells.

13. The non-volatile memory device of claim 1, further comprising the array of non-volatile memory cells, wherein the memory cells are magnetic random access memory cells.

14. A method, comprising:
receiving, at a built-in self-test circuit of a non-volatile memory device, an instruction to test a data path of the non-volatile memory device specifying either a first test mode or a second test mode, the data path being between input pads of the non-volatile memory device and a cache buffer configured to store data to be written to memory cells of the non-volatile memory device, the data path configured to convert data received at the input pads in a serial format to a parallel format for storing in the cache buffer;
in response to the instruction to test the data path, generating a test clock signal;
in response to the instruction to test the data path specifying the first test mode:
dividing a frequency of the test clock signal by a first amount; and
testing the data path using test clock signal divided by the first amount; and
in response to the instruction to test the data path specifying the second test mode:
dividing the frequency of the test clock signal by a second amount; and
testing the data path using test clock signal divided by the second amount.

15. The method of claim 14, wherein the test clock signal divided by the second amount is a slower clock signal than the test clock signal divided by the first amount and the second test mode comprises:
determining trim values for the data path.

16. The method of claim 14, wherein the test clock signal divided by the first amount is a faster clock signal than the test clock signal divided by the second amount and the first test mode comprises:
a high speed mode in which the test clock signal divided by the first amount is a faster clock than used when receiving user data at the input pads.

17. The method of claim 14, wherein dividing the frequency of the test clock signal by the first amount comprises dividing the test clock signal by a first set of one or more serially connected divide by two frequency dividers, and
wherein dividing the frequency of the test clock signal by the second amount comprises dividing the test clock signal by the first set of one or more divide by two frequency dividers and further dividing the test clock signal by a second set of one or more serially connected divide by two frequency dividers.

18. A non-volatile memory device, comprising:
an array of non-volatile memory cells;
a plurality of input/output pads;
a cache buffer configured to store data to be written in the array;
a data path circuit configured to transfer data from the plurality of input/output pads to the cache buffer, including converting the transferred data from a serial format to a parallel format; and
one or more control circuits, comprising:
a built-in self-test, including a voltage controller oscillator, connected to the data path circuit, and configured to:
receive a command to perform a test on the data path circuit specifying either a first test mode or a second test mode;
in response to receiving the command to perform the test, generate a test clock signal by the voltage controlled oscillator;

in response to the command to perform the test specifying the first test mode, divide a frequency of the test clock signal by a first amount and test the data path circuit in the first test mode using the frequency of the test clock signal divided by the first amount; and in response to the command to perform the test specifying the second test mode, divide the frequency of the test clock signal by a second amount and test the data path circuit in the second test mode using the frequency of the test clock signal divided by the second amount.

19. The non-volatile memory device of claim 18, wherein:

the test clock signal divided by the second amount is a slower clock signal than the test clock signal divided by the first amount;

the second test mode is a trim test mode; and the first test mode is a high speed data path test mode.

20. The non-volatile memory device of claim 18, the one or more control circuits further comprising:

a first set of one or more serially connected divide by two frequency dividers; and a first set of one or more serially connected divide by two frequency dividers, wherein dividing the frequency of the test clock signal by the first amount is performed using the first set of divide by two frequency dividers, and wherein dividing the frequency of the test clock signal by the second amount is performed using the first set of divide by two frequency dividers and the second set of divide by two frequency dividers in series.

* * * * *